United States Patent
Tang et al.

(10) Patent No.: US 11,637,489 B2
(45) Date of Patent: Apr. 25, 2023

(54) ISOLATED DC/DC CONVERTER AND AC/DC CONVERTER

(71) Applicant: ROHM Co., LTD., Kyoto (JP)

(72) Inventors: Yifei Tang, Kyoto (JP); Satoru Nate, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/539,294

(22) Filed: Dec. 1, 2021

(65) Prior Publication Data
US 2022/0173651 A1 Jun. 2, 2022

(30) Foreign Application Priority Data

Dec. 1, 2020 (JP) .............................. JP2020-199660

(51) Int. Cl.
| | |
|---|---|
| H02M 3/335 | (2006.01) |
| H02M 1/00 | (2006.01) |
| H02M 7/217 | (2006.01) |
| H02M 3/157 | (2006.01) |

(52) U.S. Cl.
CPC ......... H02M 1/0012 (2021.05); H02M 1/007 (2021.05); H02M 3/157 (2013.01); H02M 7/217 (2013.01); H02M 3/33523 (2013.01); H02M 3/33592 (2013.01)

(58) Field of Classification Search
CPC ....................... H02M 3/33523; H02M 3/33592
See application file for complete search history.

(56) References Cited

U.S. PATENT DOCUMENTS

| | | | | |
|---|---|---|---|---|
| 9,735,689 B2* | 8/2017 | Oyama | ............. | H02M 3/33507 |
| 9,742,299 B2* | 8/2017 | Kikuchi | ............ | H02M 3/33592 |
| 10,075,081 B2* | 9/2018 | Kikuchi | ............ | H02M 3/33592 |
| 10,075,084 B2* | 9/2018 | Kikuchi | .................. | H02J 1/102 |
| 10,333,415 B2* | 6/2019 | Kikuchi | .................. | G05F 1/618 |
| 2004/0189271 A1* | 9/2004 | Hansson | ........... | H02M 3/33515 |
| | | | | 323/283 |
| 2013/0134892 A1* | 5/2013 | Kado | ..................... | H05B 45/14 |
| | | | | 315/206 |
| 2014/0313792 A1* | 10/2014 | Nate | ................. | H02M 3/33523 |
| | | | | 363/21.15 |

(Continued)

FOREIGN PATENT DOCUMENTS

JP 2006197688 7/2006

*Primary Examiner* — Gary A Nash
(74) *Attorney, Agent, or Firm* — Chip Law Group

(57) ABSTRACT

There is provided an isolated DC/DC converter including a primary side control circuit disposed on the primary side and switching a switching element connected in series with a primary side winding of a power transformer; a secondary side control circuit disposed on the secondary side and generating a control signal including first control information and second control information on the basis of the secondary side voltage; and an insulated transmission circuit transmitting, in an insulated manner, each piece of control information included in the control signal to the primary side control circuit. The primary side control circuit controls a switching frequency of the switching element on the basis of the first control information indicating the frequency of the control signal, and controls a peak value of a primary side current on the basis of the second control information indicating the pulse width of the control signal.

12 Claims, 11 Drawing Sheets

(56) References Cited

U.S. PATENT DOCUMENTS

| | | | |
|---|---|---|---|
| 2016/0079877 A1* | 3/2016 | Lin .................. | H02M 3/33507 |
| | | | 363/21.14 |
| 2018/0026523 A1* | 1/2018 | Nate ..................... | H05B 45/10 |
| | | | 318/504 |
| 2019/0207523 A1* | 7/2019 | Oe ........................ | H02M 1/143 |

* cited by examiner

F I G . 1 2
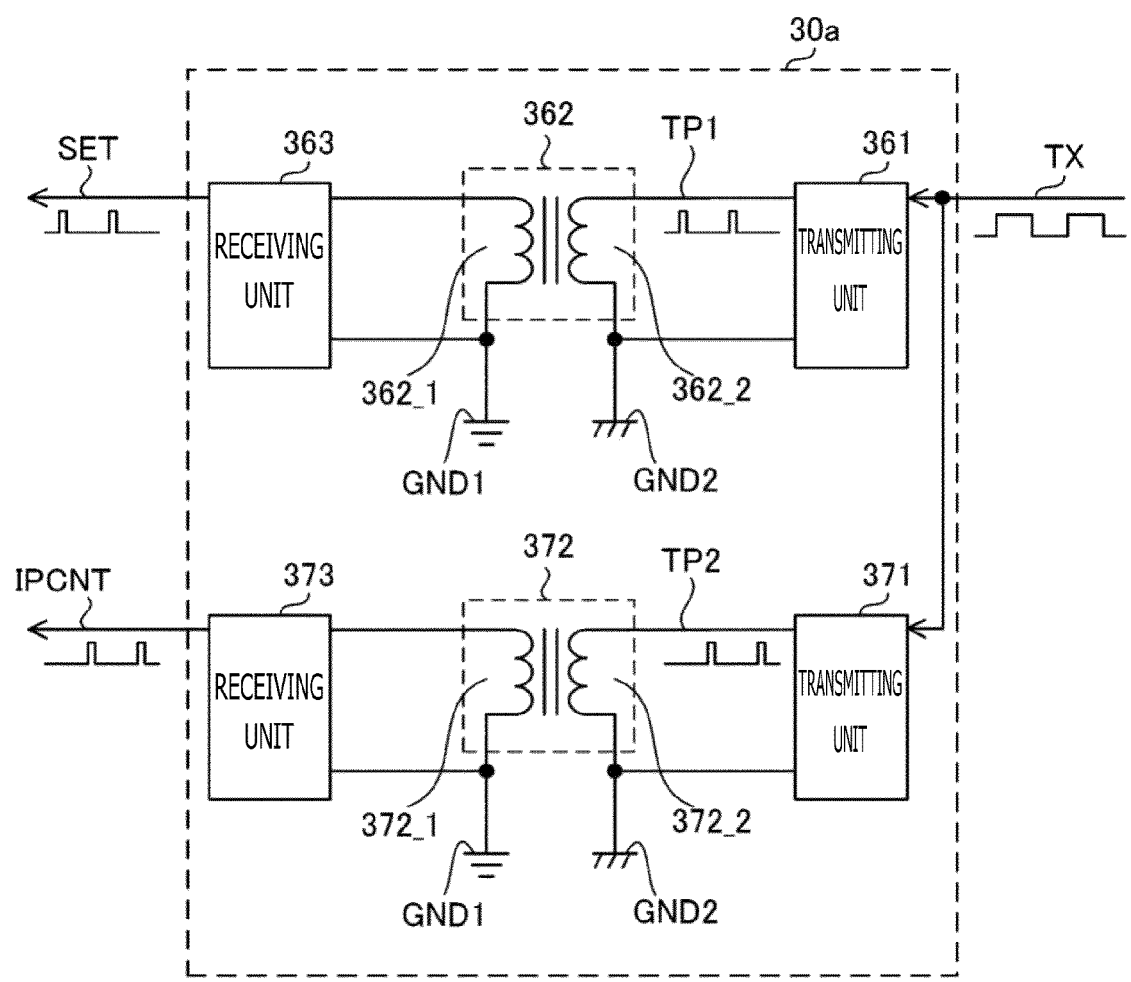

ISOLATED DC/DC CONVERTER AND AC/DC CONVERTER

CROSS REFERENCE TO RELATED APPLICATIONS

This application claims priority benefit of Japanese Patent Application No. JP 2020-199660 filed in the Japan Patent Office on Dec. 1, 2020. Each of the above-referenced applications is hereby incorporated herein by reference in its entirety.

BACKGROUND

The present disclosure relates to an isolated direct current to direct current (DC/DC) converter and an alternating current to direct current (AC/DC) converter.

A first type of isolated DC/DC converter transmits information regarding a secondary side voltage to a primary side by using a photocoupler. A primary side control circuit switching-drives a switching transistor connected to a primary side winding of a power transformer on the basis of the transmitted information. Stabilization of the secondary side voltage is thereby achieved (see Japanese Patent Laid-Open No. 2006-197688).

SUMMARY

A second type of isolated DC/DC converter is also examined in consideration of the number of parts, a reduction in a mounting area, and the like. The second type of isolated DC/DC converter uses an insulated element (for example, a pulse transformer) different from the photocoupler, and transmits a control signal representing information regarding the secondary side voltage to the primary side in a digital signal format. At this time, the control signal having a frequency corresponding to the secondary side voltage is generated on a secondary side, and the control signal is transmitted to the primary side. The switching transistor can be thereby switched in synchronism with the control signal.

However, merely controlling a switching frequency is often insufficient as control. Improvements are therefore desired. For example, there is a fear that further control cannot be performed when the frequency of the control signal reaches a maximum operating frequency on the primary side due to an increase in a load.

It is desirable to provide an isolated DC/DC converter and an AC/DC converter that contribute to realization of excellent switching control.

An isolated DC/DC converter according to the present disclosure has a configuration (first configuration) of an isolated DC/DC converter for generating a secondary side voltage on a secondary side from a primary side voltage on a primary side by using a power transformer having a primary side winding and a secondary side winding insulated from each other, the isolated DC/DC converter including a primary side control circuit that is disposed on the primary side and switches a switching element connected in series with the primary side winding; a secondary side control circuit that is disposed on the secondary side and generates a control signal including first control information and second control information on the basis of the secondary side voltage; and an insulated transmission circuit that transmits, in an insulated manner, each piece of control information included in the control signal to the primary side control circuit; the primary side control circuit controlling a switching frequency of the switching element on the basis of the first control information, and controlling a peak value of a primary side current flowing through the primary side winding through the switching element on the basis of the second control information.

The isolated DC/DC converter according to the foregoing first configuration may have a configuration (second configuration) in which the secondary side control circuit includes an error voltage generating unit that generates an error voltage corresponding to a difference between a feedback voltage corresponding to the secondary side voltage and a predetermined reference voltage, and a control signal generating unit that generates the control signal on the basis of the error voltage and a slope voltage that varies within a predetermined range.

The isolated DC/DC converter according to the foregoing second configuration may have a configuration (third configuration) in which the control signal has information regarding a frequency corresponding to the error voltage as the first control information, and has information corresponding to a result of comparison between the error voltage and the slope voltage as the second control information.

The isolated DC/DC converter according to the foregoing third configuration may have a configuration (fourth configuration) in which the control signal generating unit generates, as the control signal, a signal having the frequency corresponding to the error voltage and having a pulse width corresponding to the result of the comparison between the error voltage and the slope voltage, the first control information is information regarding the frequency of the control signal, and the second control information is information regarding the pulse width of the control signal, the insulated transmission circuit generates a first received signal having the first control information and a second received signal having the second control information on the primary side by transmitting the first and second control information to the primary side by using an insulated element disposed between the primary side and the secondary side, and the primary side control circuit controls the switching frequency of the switching element and controls the peak value of the primary side current flowing through the primary side winding through the switching element, on the basis of the first and second received signals.

The isolated DC/DC converter according to the foregoing fourth configuration may have a configuration (fifth configuration) in which the control signal is a rectangular wave signal assuming a signal level of a first level or a second level, a length of a period in which the signal level of the control signal is the second level corresponds to the pulse width of the control signal in each cycle of the control signal, the control signal generating unit makes the signal level of the control signal make a transition from the first level to the second level at the frequency corresponding to the error voltage, and makes the signal level of the control signal make a transition from the second level to the first level on the basis of the result of the comparison between the error voltage and the slope voltage in each cycle of the control signal, the cycle starting in transition timing from the first level to the second level, using the insulated element, the insulated transmission circuit generates the first received signal including a pulse synchronous with the transition from the first level to the second level of the signal level of the control signal on the primary side, and generates the second received signal including a pulse synchronous with the transition from the second level to the first level of the signal level of the control signal on the primary side, and the primary side control circuit includes a determination voltage setting unit that sets a determination voltage variably within a predetermined voltage range on the basis of the second received signal, and turns off the switching element when a current sense voltage proportional to the primary side current reaches the determination voltage after turning on the switching element in synchronism with timing of the pulse in the first received signal.

The isolated DC/DC converter according to the foregoing fifth configuration may have a configuration (sixth configuration) in which the control signal generating unit makes the signal level of the control signal make a transition from the first level to the second level at the frequency corresponding to the error voltage, the slope voltage monotonically changes in a predetermined direction from a predetermined initial voltage in each cycle of the control signal, the cycle starting in the transition timing, and when magnitude relation between the error voltage and the slope voltage is reversed before passage of a predetermined time from the transition timing, the control signal generating unit makes the signal level of the control signal make a transition from the second level to the first level in timing succeeding the transition timing by the predetermined time, and when the magnitude relation is reversed after the passage of the predetermined time from the transition timing, the control signal generating unit makes the signal level of the control signal make a transition from the second level to the first level in timing of the reversal.

In addition, for example, the isolated DC/DC converter according to the foregoing fifth or sixth configuration may have a configuration (seventh configuration) in which the determination voltage setting unit fixes the determination voltage until the switching element is turned off after the switching element is turned on in synchronism with the pulse in the first received signal, sets the determination voltage to a maximum voltage within the voltage range when the switching element is turned off, then decreases the determination voltage from the maximum voltage within the voltage range according to a predetermined rule with the pulse in the second received signal as a trigger, and stops decreasing the determination voltage when a next pulse occurs in the first received signal.

The isolated DC/DC converter according to any one of the foregoing fourth to seventh configurations may have a configuration (eighth configuration) in which the insulated element is formed by a capacitor.

The isolated DC/DC converter according to any one of the foregoing fifth to seventh configurations may have a configuration (ninth configuration) in which the insulated element is formed by a capacitor, and the insulated transmission circuit generates the first received signal by transmitting the transition from the first level to the second level of the signal level of the control signal to the primary side by using the capacitor, and generates the second received signal by transmitting the transition from the second level to the first level of the signal level of the control signal to the primary side by using the capacitor.

The isolated DC/DC converter according to any one of the foregoing fourth to seventh configurations may have a configuration (tenth configuration) in which the insulated element is formed by a pulse transformer.

The isolated DC/DC converter according to any one of the foregoing fifth to seventh configurations may have a configuration (eleventh configuration) in which the insulated element includes a first pulse transformer and a second pulse transformer, and the insulated transmission circuit generates the first received signal by transmitting the transition from the first level to the second level of the signal level of the control signal to the primary side by using the first pulse transformer, and generates the second received signal by transmitting the transition from the second level to the first level of the signal level of the control signal to the primary side by using the second pulse transformer.

An AC/DC converter according to the present disclosure has a configuration (twelfth configuration) including a rectifier circuit that full wave rectifies an alternating-current voltage; a smoothing capacitor that generates a direct-current voltage by smoothing the full wave rectified voltage; and the isolated DC/DC converter according to any one of the foregoing first to eleventh configurations, the isolated DC/DC converter generating the secondary side voltage of a direct current as an output voltage from the primary side voltage as the direct-current voltage.

According to the present disclosure, it is possible to provide an isolated DC/DC converter and an AC/DC converter that contribute to realization of excellent switching control.

BRIEF DESCRIPTION OF THE DRAWINGS

FIG. 12 is a block diagram of an insulated transmission circuit according to a second embodiment of the present disclosure.

DETAILED DESCRIPTION OF THE PREFERRED EMBODIMENTS

Figure 1:
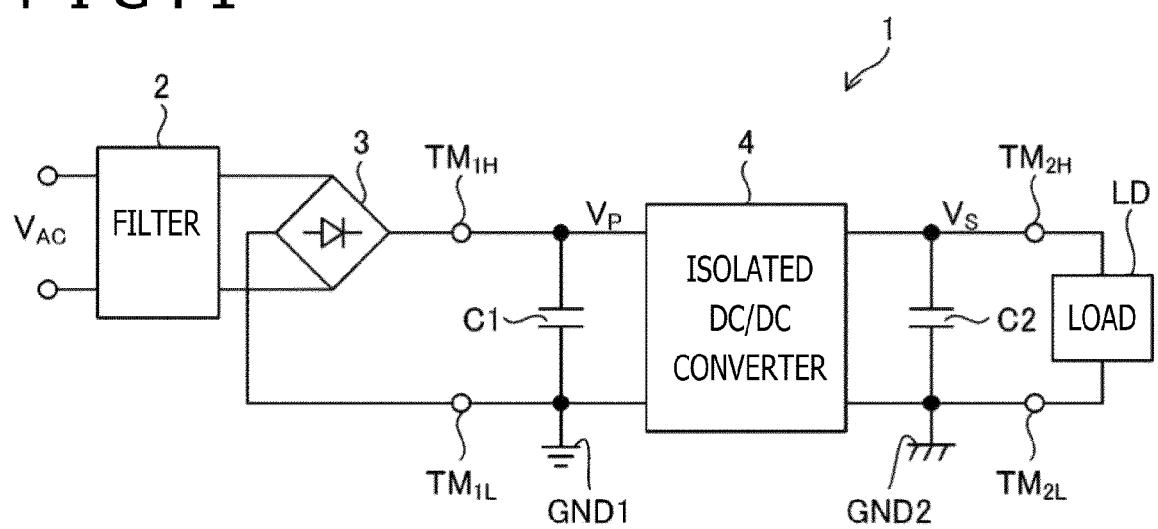
FIG. 1 is a diagram illustrating a general configuration of an AC/DC converter according to a first embodiment of the present disclosure.

Examples of embodiments of the present disclosure will hereinafter be described concretely with reference to the drawings. In the drawings to be referred to, the same parts are identified by the same reference symbols, and repeated description of the same parts will be omitted in principle. Incidentally, in the present specification, for simplification of description, the names of information, signals, physical quantities, elements, parts, or the like corresponding to symbols or reference symbols referring to the information, the signals, the physical quantities, the elements, the parts, or the like may be omitted or abbreviated by indicating the symbols or the reference symbols. For example, a switching transistor referred to by "M1," which switching transistor will be described later (see FIG. 2), may be written as a switching transistor M1, or may be abbreviated as a transistor M1. However, the switching transistor M1 and the transistor M1 each refer to the same thing.

Description will first be made of a few terms used to describe the embodiment of the present disclosure. A level refers to a potential level, and for any signal or voltage of interest, a high level has a higher potential than a low level. For any signal or voltage of interest, a state in which the signal or the voltage is at a high level means that the level of the signal or the voltage is a high level, and a state in which the signal or the voltage is at a low level means that the level of the signal or the voltage is a low level. The level of a signal may be expressed as a signal level. The level of a voltage may be expressed as a voltage level. In any signal or voltage of interest, a change from a low level to a high level will be referred to as an up edge (or a rising edge), and the timing of the change from the low level to the high level will be referred to as an up edge timing (or a rising edge timing). Similarly, in any signal or voltage of interest, a change from a high level to a low level will be referred to as a down edge (or a falling edge), and the timing of the change from the high level to the low level will be referred to as a down edge timing (or a falling edge timing).

For any transistor configured as a field-effect transistor (FET) including a MOSFET, an on state refers to a state in which there is conduction between the drain and source of the transistor, and an off state refers to a state in which there is no conduction between the drain and source of the transistor (interrupted state). The same is true for transistors not classified as FETs. The MOSFET is construed as an enhancement MOSFET unless otherwise specified. The MOSFET is an abbreviation of "metal-oxide-semiconductor field-effect transistor." PWM is an abbreviation of pulse width modulation.

In the following, for any transistor, an on state and an off state may be expressed simply as on and off. For any transistor, a change from an off state to an on state will be expressed as turning on, and a change from an on state to an off state will be expressed as turning off. In addition, for any transistor, a period in which the transistor is in an on state may be referred to as an on period, and a period in which the transistor is in an off state may be referred to as an off period. For any signal assuming a signal level of a high level or a low level, a period in which the level of the signal is a high level will be referred to as a high level period, and a period in which the level of the signal is a low level will be referred to as a low level period. The same is true for any voltage assuming a voltage level of a high level or a low level.

First Embodiment

A first embodiment of the present disclosure will be described. FIG. 1 is a general configuration diagram of an AC/DC converter 1 according to the first embodiment. The AC/DC converter 1 includes a filter 2, a rectifier circuit 3, a DC/DC converter 4 as an isolated DC/DC converter 4, a smoothing capacitor C1, and an output capacitor C2. The output capacitor C2 may be construed as being included in constituent elements of the DC/DC converter 4. As details will be clear from the following description, the AC/DC converter 1 generates a secondary side voltage $V_S$ from a primary side voltage $V_P$ by a switching system using a transformer.

The AC/DC converter 1 includes a primary side circuit disposed on the primary side of the AC/DC converter 1 and a secondary side circuit disposed on the secondary side of the AC/DC converter 1. The primary side circuit and the secondary side circuit are electrically insulated from each other. In the present specification, insulation means that transmission of a direct-current signal and power is blocked. The filter 2, the rectifier circuit 3, and the smoothing capacitor C1 are arranged in the primary side circuit. The output capacitor C2 is disposed in the secondary side circuit. The DC/DC converter 4 is disposed between the primary side circuit and the secondary side circuit. Incidentally, when attention is directed to the DC/DC converter 4, the primary side circuit may be construed as a circuit disposed on the primary side in a circuit constituting the DC/DC converter 4, and the secondary side circuit may be construed as a circuit disposed on the secondary side in the circuit constituting the DC/DC converter 4.

A ground in the primary side circuit will be referred to by "GND1." A ground in the secondary side circuit will be referred to by "GND2." Any voltage or signal in the primary side circuit, including the primary side voltage $V_P$, is a voltage or a signal having the ground GND1 as a reference, and has a potential as viewed from the ground GND1. Any voltage or signal in the secondary side circuit, including the secondary side voltage $V_S$, is a voltage or a signal having the ground GND2 as a reference, and has a potential as viewed from the ground GND2. In each of the primary side circuit and the secondary side circuit, the ground refers to a reference conductive portion (predetermined potential point) having a reference potential of 0 V (zero volts), or refers to the reference potential itself. However, the ground GND1 and the ground GND2 are insulated from each other, and can therefore have potentials different from each other. The reference conductive portion is formed by a conductor such as a metal.

The filter 2 removes noise of an alternating-current voltage $V_{AC}$ input to the AC/DC converter 1. The alternating-current voltage $V_{AC}$ may be a commercial alternating voltage. The rectifier circuit 3 is a diode bridge circuit that full wave rectifies the alternating-current voltage $V_{AC}$ supplied through the filter 2. The smoothing capacitor C1 generates a direct-current voltage by smoothing the full wave rectified voltage. The direct-current voltage generated in the smoothing capacitor C1 functions as the primary side voltage $V_P$. The primary side voltage $V_P$ is applied between a pair of input terminals $TM_{1H}$ and $TM_{1L}$. Specifically, a terminal on a low potential side of the smoothing capacitor C1 is connected to the ground GND1 and connected to the input terminal $TM_{1L}$, and a terminal on a high potential side of the smoothing capacitor C1 is connected to the input terminal $TM_{1H}$. The primary side voltage $V_P$ is applied to the input terminal $TM_{1H}$ with a potential at the input terminal $TM_{1L}$ as a reference.

The DC/DC converter 4 generates the secondary side voltage $V_S$ stabilized at a predetermined target voltage $V_{TG}$ by subjecting the primary side voltage $V_P$ to power conversion (DC-to-DC conversion) by a switching system. The secondary side voltage $V_S$ corresponds to an output voltage of the AC/DC converter 1. The secondary side voltage $V_S$ is applied between a pair of output terminals $TM_{2H}$ and $TM_{2L}$. Specifically, a terminal on a low potential side of the output capacitor C2 is connected to the ground GND2 and connected to the output terminal $TM_{2L}$, and a terminal on a high potential side of the output capacitor C2 is connected to the output terminal $TM_{2H}$. The secondary side voltage $V_S$ is applied to the output terminal $TM_{2H}$ with a potential at the output terminal $TM_{2L}$ as a reference. The pair of input terminals $TM_{1H}$ and $TM_{1L}$ may be considered to correspond to an input terminal pair in the DC/DC converter 4. The pair of output terminals $TM_{2H}$ and $TM_{2L}$ may be considered to correspond to an output terminal pair in the AC/DC converter 1 or the DC/DC converter 4.

FIG. 1 also illustrates a load LD. The load LD can be considered to be a load of the AC/DC converter 1, or can be considered to be a load of the DC/DC converter 4 when attention is directed to the DC/DC converter 4. The load LD is any load connected to the pair of output terminals $TM_{2H}$ and $TM_{2L}$ and driven on the basis of the secondary side voltage $V_S$. The load LD is, for example, a microcomputer, a digital signal processor (DSP), a power supply circuit, a lighting apparatus, an analog circuit, or a digital circuit.

Figure 2:
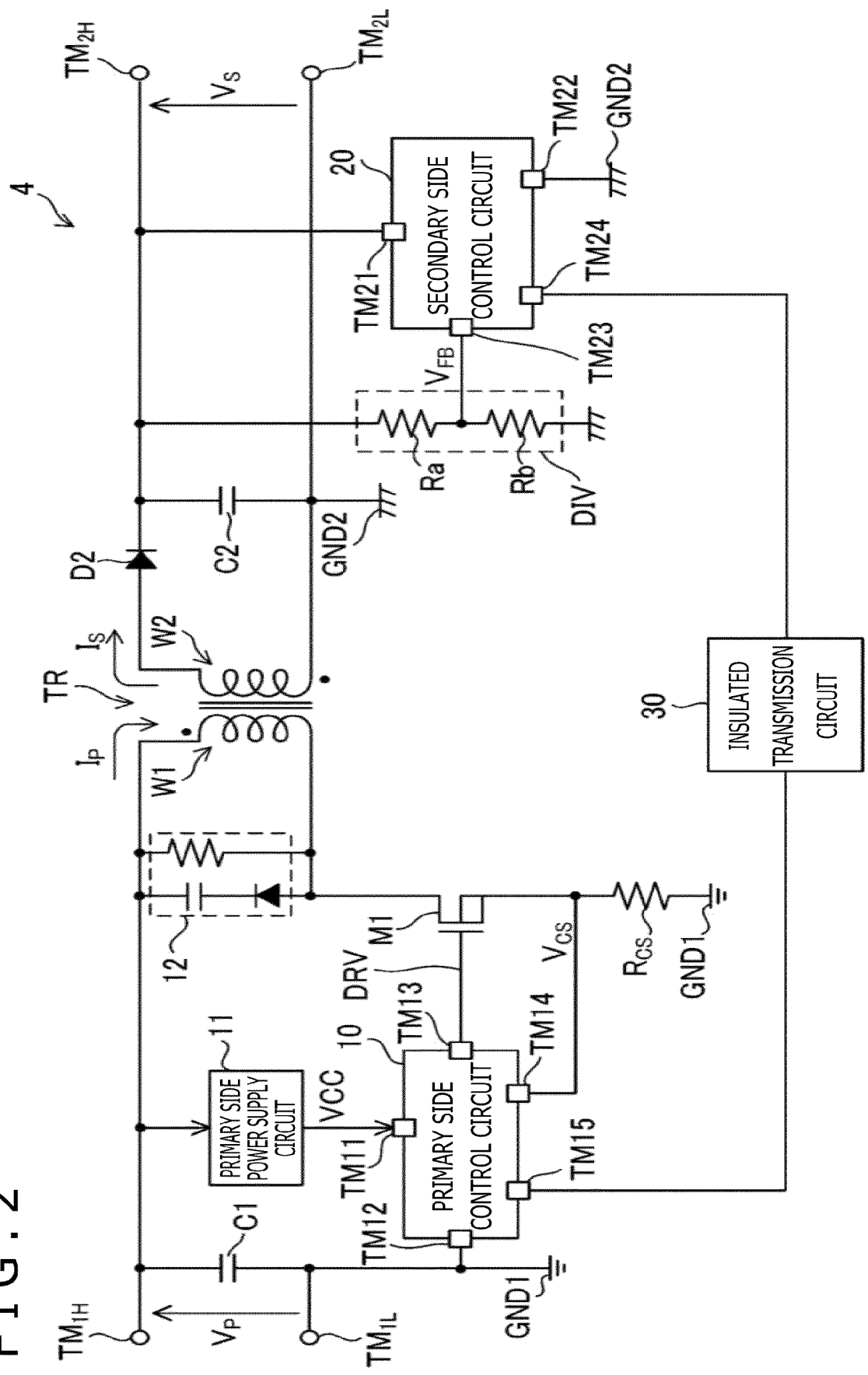
FIG. 2 is a block diagram of a DC/DC converter included in the AC/DC converter, the block diagram being related to the first embodiment of the present disclosure.

FIG. 2 illustrates an example of an internal configuration of the DC/DC converter 4 provided to the AC/DC converter 1. The DC/DC converter 4 includes a transformer TR as a power transformer having a primary side winding W1 and a secondary side winding W2. In the transformer TR, the primary side winding W1 and the secondary side winding W2 are magnetically coupled in opposite polarity to each other while electrically insulated from each other.

In addition to the primary side winding W1, the primary side circuit of the DC/DC converter 4 (in other words, the primary side circuit of the AC/DC converter 1) is provided with a primary side control circuit 10, a primary side power supply circuit 11, a snubber circuit 12, the smoothing capacitor C1, a switching transistor M1 as an example of a switching element, and a sense resistance $R_{CS}$. When attention is directed to the DC/DC converter 4, the smoothing capacitor C1 is referred to also as an input capacitor C1. As described above, the input capacitor C1 is provided between the input terminals $TM_{1L}$ and $TM_{1H}$, and the primary side voltage $V_P$ is applied across the input capacitor C1.

The switching transistor M1 is configured as an N-channel MOSFET. One terminal of the primary side winding W1 is connected to the input terminal $TM_{1H}$, and receives the direct-current primary side voltage $V_P$. Another terminal of the primary side winding W1 is connected to a drain of the switching transistor M1. A source of the switching transistor M1 is connected to the ground GND1 via the sense resistance $R_{CS}$. The primary side power supply circuit 11 generates a power supply voltage VCC having a desired voltage value by subjecting the primary side voltage $V_P$ to DC-to-DC conversion. The primary side power supply circuit 11 supplies the power supply voltage VCC to the primary side control circuit 10. The primary side control circuit 10 is driven on the basis of the power supply voltage (driving voltage) VCC.

The primary side control circuit 10 is connected to a gate of the switching transistor M1. The primary side control circuit 10 switching-drives the switching transistor M1 by supplying a driving signal DRV to the gate of the switching transistor M1. The driving signal DRV is a signal in the form of a rectangular wave whose signal level changes between a low level and a high level. When signals at the low level and the high level are supplied to the gate of the transistor M1, the transistor M1 is in an off state and an on state, respectively. The snubber circuit 12 is connected in parallel with the primary side winding W1. The snubber circuit 12 absorbs a transient high voltage that can occur at the drain of the transistor M1 at a time of turning off the transistor M1.

In addition to the secondary side winding W2, the secondary side circuit of the DC/DC converter 4 (in other words, the secondary side circuit of the AC/DC converter 1) is provided with a secondary side control circuit 20, a rectifier diode D2, a voltage dividing circuit DIV, and the output capacitor C2.

One terminal of the secondary side winding W2 is connected to an anode of the rectifier diode D2. A cathode of the rectifier diode D2 is connected to the output terminal $TM_{2H}$. Another terminal of the secondary side winding W2 is connected to the output terminal $TM_{2L}$. As described above, the output capacitor C2 is provided between the output terminals $TM_{2L}$ and $TM_{2H}$, and the secondary side voltage $V_S$ is applied across the output capacitor C2. The voltage dividing circuit DIV includes a plurality of voltage dividing resistances. The voltage dividing circuit DIV generates a feedback voltage $V_{FB}$ corresponding to the secondary side voltage $V_S$ by dividing the secondary side voltage $V_S$. Suppose here that the voltage dividing circuit DIV includes a series circuit of voltage dividing resistances Ra and Rb, that one terminal of the voltage dividing resistance Ra is connected to the output terminal $TM_{2H}$, and that another terminal of the voltage dividing resistance Ra is connected to the ground GND2 via the voltage dividing resistance Rb. Then, the feedback voltage $V_{FB}$ as a divided voltage of the secondary side voltage $V_S$ is applied to a connection node between the voltage dividing resistances Ra and Rb. The secondary side control circuit 20 is driven by using the secondary side voltage $V_S$ as a power supply voltage (driving voltage).

A current flowing from the input terminal $TM_{1H}$ through the primary side winding W1, the switching transistor M1, and the sense resistance $R_{CS}$ to the ground GND1 in the primary side circuit will be referred to as a primary side current, and referred to by a symbol "$I_P$." A current flowing from the ground GND2 through the secondary side winding W2 to the anode of the rectifier diode D2 in the secondary side circuit will be referred to as a secondary side current, and denoted by a symbol "$I_S$." In addition, a voltage occurring across the sense resistance $R_{CS}$ (that is, a voltage drop across the sense resistance $R_{CS}$) will be referred to as a current sense voltage $V_{CS}$. The current sense voltage $V_{CS}$ is a voltage having the potential of the ground GND1 as a reference, and has a voltage value proportional to the primary side current $I_P$ (more specifically proportional to an instantaneous value of the primary side current $I_P$).

The DC/DC converter 4 is provided with an insulated transmission circuit 30 between the primary side circuit and the secondary side circuit. The insulated transmission circuit 30 is a circuit for realizing communication between the primary side control circuit 10 and the secondary side control circuit 20. Communication via the insulated transmission circuit 30 is communication in an insulated manner (that is, communication in a state in which the primary side circuit and the secondary side circuit are insulated from each other). In the present embodiment, communication via the insulated transmission circuit 30 is one-way communication from the secondary side control circuit 20 to the primary side control circuit 10. However, the DC/DC converter 4 may be configured such that two-way communication is possible between the control circuits 10 and 20. In the following, attention will be directed only to one-way communication from the secondary side control circuit 20 to the primary side control circuit 10.

The primary side control circuit 10 can not only generate the driving signal DRV on the basis of the current sense voltage $V_{CS}$ without depending on the secondary side control circuit 20 but also generate the driving signal DRV under control of the secondary side control circuit 20 via the insulated transmission circuit 30.

The primary side control circuit 10 is provided with a plurality of terminals. The plurality of terminals provided to the primary side control circuit 10 include a terminal TM11 that receives the power supply voltage VCC, a terminal TM12 connected to the ground GND1, a terminal TM13 connected to the gate of the switching transistor M1, a terminal TM14 that receives the current sense voltage $V_{CS}$, and a terminal TM15 connected to the insulated transmission circuit 30 on the primary side. The terminal TM15 may be constituted by two or more terminals.

The secondary side control circuit 20 is provided with a plurality of terminals. The plurality of terminals provided to the secondary side control circuit 20 include a terminal TM21 that receives the secondary side voltage $V_S$, a terminal TM22 connected to the ground GND2, a terminal TM23 that receives the feedback voltage $V_{FB}$, and a terminal TM24 connected to the insulated transmission circuit 30 on the secondary side. The terminal TM24 may be constituted by two or more terminals. Incidentally, the voltage dividing circuit DIV may be included in the secondary side control circuit 20. In this case, the terminal TM23 represents an internal terminal of the secondary side control circuit 20.

The thus configured DC/DC converter 4 can provide the secondary side voltage $V_S$ from the primary side voltage $V_P$ by switching the switching transistor M1. This switching alternately turns on and off the switching transistor M1. Energy is stored in the primary side winding W1 in an on period of the switching transistor M1. Then, when the stored energy is released from the secondary side winding W2 in an off period of the switching transistor M1 (specifically, when the secondary side current $I_S$ based on the stored energy flows through the rectifier diode D2 in the off period of the switching transistor M1), the output capacitor C2 is charged, and the secondary side voltage $V_S$ is obtained.

Incidentally, instead of providing the primary side power supply circuit 11, an auxiliary winding may be provided to the transformer TR, and a self power supply circuit including the auxiliary winding may generate the power supply voltage VCC of the primary side control circuit 10.

In addition, while the configuration of the DC/DC converter 4 adopting a diode rectification system has been cited above as an example, the DC/DC converter 4 can freely be selected as long as the DC/DC converter 4 is an isolated DC/DC converter that generates the secondary side voltage $V_S$ on the secondary side of the transformer TR by a switching system from the primary side voltage $V_P$ applied to the primary side winding W1. For example, a synchronous rectification type DC/DC converter 4 may be formed by providing a synchronous rectifier transistor (not illustrated) in place of the rectifier diode D2 in the secondary side circuit. In this case, the synchronous rectifier transistor is inserted between one end of the secondary side winding W2 and the output terminal $TM_{2H}$ or $TM_{2L}$, and the secondary side control circuit 20 turns on the synchronous rectifier transistor in the whole or a part of an off period of the switch transistor M1. In addition, for example, the DC/DC converter 4 may be configured as a forward type isolated DC/DC converter. Also in this case, either of the synchronous rectification system and the diode rectification system may be adopted.

Figure 3:
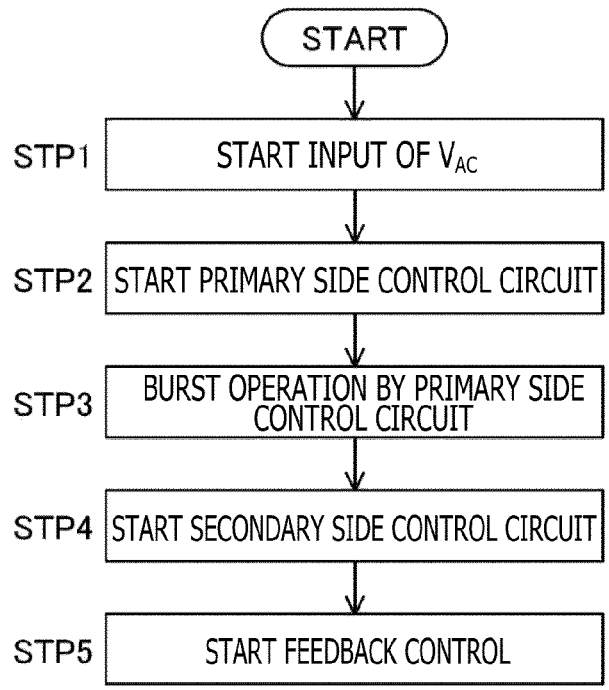
FIG. 3 is a diagram illustrating a flow of operation of the AC/DC converter, the diagram being related to the first embodiment of the present disclosure.

FIG. 3 is an operation flowchart of the AC/DC converter 1 and the DC/DC converter 4. When input of the alternating-current voltage $V_{AC}$ to the AC/DC converter 1 is started (step STP1), the primary side voltage $V_P$ rises, and thereby the power supply voltage VCC that can start the primary side control circuit 10 is generated, so that the primary side control circuit 10 is started (step STP2). When the primary side control circuit 10 is started, the primary side control circuit 10 first performs a predetermined burst operation (step STP3). The primary side control circuit 10 performs the burst operation singly without depending on the secondary side control circuit 20. In the burst operation, the primary side control circuit 10 periodically and repeatedly performs an operation of turning off the switching transistor M1 at a point in time that the voltage value of the current sense voltage $V_{CS}$ reaches a predetermined value after turning on the switching transistor M1. The output capacitor C2 thereby becomes charged. When the secondary side voltage $V_S$ reaches a predetermined secondary side starting voltage, the secondary side control circuit 20 is started (step STP4). After the starting of the secondary side control circuit 20, feedback control is started in which the transistor M1 is switching-driven by cooperation between the control circuits 10 and 20 (step STP5).

In the following, in the present embodiment, description will be made of contents of the feedback control performed after the starting of the secondary side control circuit 20 and a configuration for performing the feedback control.

[Secondary Side Control Circuit 20]

Figure 4:
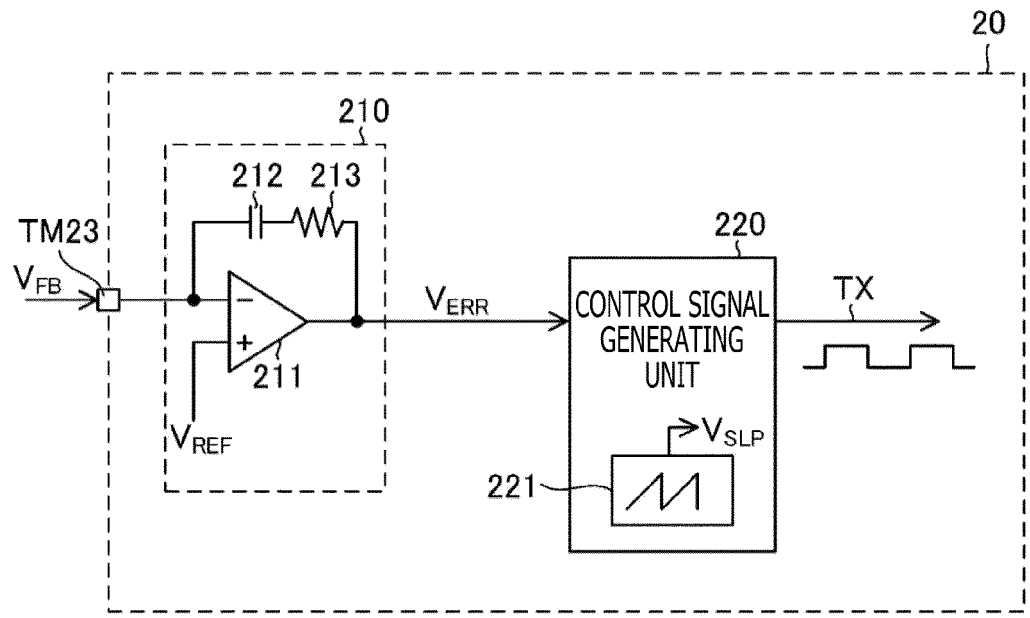
FIG. 4 is a block diagram of a secondary side control circuit according to the first embodiment of the present disclosure.

FIG. 4 illustrates an internal configuration of the secondary side control circuit 20. The secondary side control circuit 20 includes an error voltage generating unit 210 that generates an error voltage $V_{ERR}$ and a control signal generating unit 220 that generates a control signal TX. The feedback voltage $V_{FB}$, the error voltage $V_{ERR}$, a reference voltage $V_{REF}$ and a slope voltage $V_{SLP}$ to be described later, and the control signal TX are a voltage or a signal in the secondary side circuit, and therefore have a potential as viewed from the ground GND2 (have a potential with the potential of the ground GND2 set at 0 V).

The error voltage generating unit 210 includes an error amplifier 211. The feedback voltage $V_{FB}$ and the reference voltage $V_{REF}$ are respectively input to an inverting input terminal and a non-inverting input terminal of the error amplifier 211. The error voltage $V_{ERR}$ corresponding to a difference between the feedback voltage $V_{FB}$ and the reference voltage $V_{REF}$ is output from an output terminal of the error amplifier 211. The reference voltage $V_{REF}$ is a positive direct-current voltage generated within the secondary side control circuit 20. The reference voltage $V_{REF}$ has a predetermined voltage value higher than the potential of the ground GND2. When the feedback voltage $V_{FB}$ is lower than the reference voltage $V_{REF}$, the error amplifier 211 outputs a current to wiring to which the error voltage $V_{ERR}$ is applied through the own output terminal of the error amplifier 211 so as to raise the error voltage $V_{ERR}$. When the feedback voltage $V_{FB}$ is higher than the reference voltage $V_{REF}$, the error amplifier 211 draws in the current from the wiring to which the error voltage $V_{ERR}$ is applied through the own output terminal of the error amplifier 211 so as to lower the error voltage $V_{ERR}$. Because the feedback control is performed such that the feedback voltage $V_{FB}$ coincides with the reference voltage $V_{REF}$, the secondary side voltage $V_S$ is stabilized at a target voltage $V_{TG}$ determined by the reference voltage $V_{REF}$ and a voltage division ratio of the voltage dividing circuit DIV.

In the configuration example of FIG. 4, the error voltage generating unit 210 is provided with a capacitor 212 and a resistance 213. The error amplifier 211, the capacitor 212, and the resistance 213 form an integrating circuit. Specifically, in the configuration example of FIG. 4, one terminal of the resistance 213 is connected to the output terminal of the error amplifier 211, and another terminal of the resistance 213 is connected to the inverting input terminal of the error amplifier 211 via the capacitor 212. As a result, an integral in a time direction of a difference between the feedback voltage $V_{FB}$ and the reference voltage $V_{REF}$ is obtained as the error voltage $V_{ERR}$.

Figure 6:
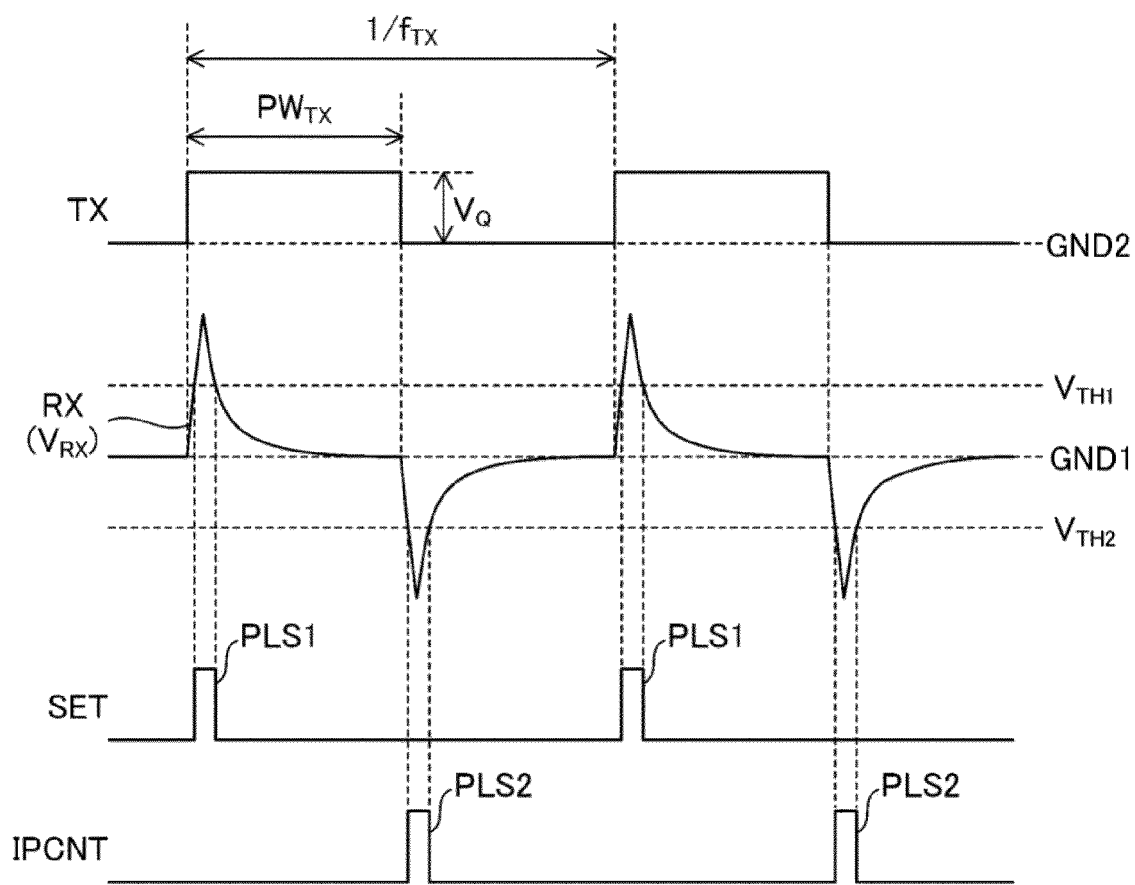
FIG. 6 is a waveform chart of a control signal generated on a secondary side and a plurality of signals occurring or generated on a primary side on the basis of the control signal, the waveform chart being related to the first embodiment of the present disclosure.

The control signal generating unit 220 includes a slope voltage generating unit 221 that generates a slope voltage $V_{SLP}$. The control signal generating unit 220 generates a digital control signal TX on the basis of the error voltage $V_{ERR}$ and the slope voltage $V_{SLP}$. The slope voltage $V_{SLP}$ is a voltage varying with the passage of time within a predetermined slope variable range. The slope voltage $V_{SLP}$ may be a voltage in the form of a triangular wave or a sawtooth wave. The control signal TX is a rectangular wave signal having a signal level of a low level or a high level. FIG. 6 illustrates an example of the waveform of the control signal TX. The frequency of the control signal TX is denoted by a symbol "$f_{TX}$." A period of one cycle of the control signal TX includes a high level period of the control signal TX and a low level period of the control signal TX which low level period is adjacent to the high level period. The length of the high level period of the control signal TX in each cycle of the control signal TX will be referred to as a pulse width $PW_{TX}$. Here, each cycle of the control signal TX is considered to start with a high level period of the control signal TX. The high level potential of the control signal TX is higher than the low level potential of the control signal TX by a predetermined voltage $V_Q$.

The control signal generating unit 220 determines and controls a frequency $f_{TX}$ of the control signal TX on the basis of the error voltage $V_{ERR}$, and determines and controls the pulse width $PW_{TX}$ on the basis of a result of comparison between the error voltage $V_{ERR}$ and the slope voltage $V_{SLP}$. The control signal TX therefore has first control information as information regarding the frequency $f_{TX}$ and second control information as information regarding the pulse width $PW_{TX}$ (information corresponding to the result of the comparison between the error voltage $V_{ERR}$ and the slope voltage $V_{SLP}$).

[Insulated Transmission Circuit 30]

Figure 5:
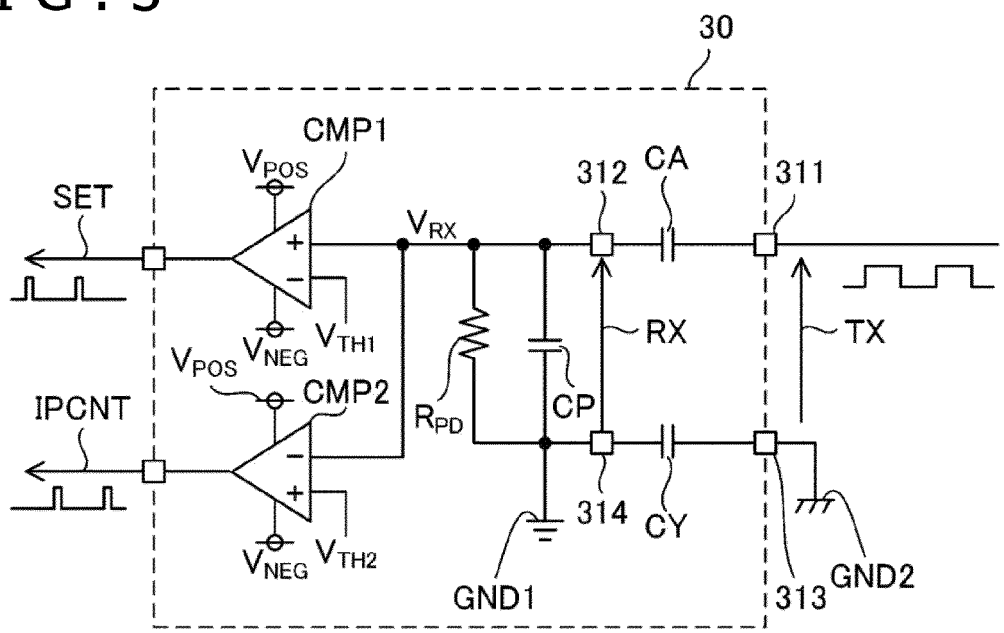
FIG. 5 is a block diagram of an insulated transmission circuit according to the first embodiment of the present disclosure.

FIG. 5 illustrates an internal configuration of the insulated transmission circuit 30. The insulated transmission circuit 30 transmits the first and second control information described above to the primary side by using an insulated element provided between the primary side and the secondary side. The insulated transmission circuit 30 thereby generates, on the primary side, a first received signal (in other words, a first receiving side generated signal) having the first control information and a second received signal (in other words, a second receiving side generated signal) having the second control information. Signals SET and IPCNT to be described later are an example of the first and second received signals. In the first embodiment, a capacitor is used as the insulated element. Specifically, the insulated transmission circuit 30 in FIG. 5 includes capacitors CA and CY, a capacitor CP, a resistance $R_{PD}$, and comparators CMP1 and CMP2. Terminals 311 to 314 illustrated in FIG. 5 are internal terminals or metallic pads provided to the insulated transmission circuit 30. The terminals 311 and 313 are provided within the secondary side circuit. The terminals 312 and 314 are provided within the primary side circuit.

The capacitors CA and CY are each a capacitor provided between the primary side and the secondary side (in other words, a capacitor provided between the primary side circuit and the secondary side circuit). The capacitors CA and CY are formed by a high withstand voltage ceramic capacitor or other capacitors. One terminal of the capacitor CA is connected to the terminal 311 within the secondary side circuit. Another terminal of the capacitor CA is connected to the terminal 312 within the primary side circuit. One terminal of the capacitor CY is connected to the terminal 313 within the secondary side circuit. Another terminal of the capacitor CY is connected to the terminal 314 within the primary side circuit. The terminal 313 is connected to the ground GND2. The control signal TX is input to the terminal 311 with the potential of the terminal 313 as a reference. When the control signal TX is at a low level, a potential difference between the terminals 311 and 313 is zero. When the control signal TX is at a high level, the potential of the terminal 311 is higher by a voltage $V_Q$ (see FIG. 6) as viewed from the potential of the terminal 313. The control signal TX is input to the terminal 311 through the terminal TM24 illustrated in FIG. 2.

The capacitor CP, the resistance $R_{PD}$, and the comparators CMP1 and CMP2 are provided in the primary side circuit. One terminal of each of the capacitor CP and the resistance $R_{PD}$ is connected to the terminal 312, while another terminal of each of the capacitor CP and the resistance $R_{PD}$ is connected to the terminal 314. The terminal 314 is connected to the ground GND1. A signal occurring at the terminal 312 as viewed from the potential of the terminal 314 will be referred to as a signal RX. A voltage having the potential of the signal RX will be referred to as a voltage $V_{RX}$. The terminal 312 is commonly connected to a non-inverting input terminal of the comparator CMP1 and an inverting input terminal of the comparator CMP2. The signal RX is therefore input (in other words, the voltage $V_{RX}$ is input) to the non-inverting input terminal of the comparator CMP1 and the inverting input terminal of the comparator CMP2. A predetermined positive threshold voltage $V_{TH1}$ is input to an inverting input terminal of the comparator CMP1. A predetermined negative threshold voltage $V_{TH2}$ is input to a non-inverting input terminal of the comparator CMP2.

The comparator CMP1 compares the voltage $V_{RX}$ and the threshold voltage $V_{TH1}$ with each other, and outputs a signal SET based on a result of the comparison. The comparator CMP2 compares the voltage $V_{RX}$ and the threshold voltage $V_{TH2}$ with each other, and outputs a signal IPCNT based on a result of the comparison. The threshold voltages $V_{TH1}$ and $V_{TH2}$, $V_{RX}$, and the signals RX, SET, and IPCNT are a voltage or a signal in the primary side circuit, and therefore have a potential as viewed from the ground GND1 (have a potential with the potential of the ground GND1 set at 0 V).

The signal SET is a binarized signal assuming a signal level of a high level or a low level. Specifically, the comparator CMP1 sets the signal SET at the high level when the voltage $V_{RX}$ is higher than the threshold voltage $V_{TH1}$, and sets the signal SET at the low level when the voltage $V_{RX}$ is lower than the threshold voltage $V_{TH1}$ (see also FIG. 6). When "$V_{RX}=V_{TH1}$," the signal SET is at the high level or the low level. The signal IPCNT is also a binarized signal assuming a signal level of a high level or a low level. Specifically, the comparator CMP2 sets the signal IPCNT at the high level when the threshold voltage $V_{TH2}$ is higher than the voltage $V_{RX}$, and sets the signal IPCNT at the low level when the threshold voltage $V_{TH2}$ is lower than the voltage $V_{RX}$ (see also FIG. 6). When "$V_{RX}=V_{TH2}$," the signal IPCNT is at the high level or the low level.

Each of the comparators CMP1 and CMP2 is driven by using a positive direct-current voltage in the primary side circuit as a power supply voltage $V_{POS}$ on a positive side, the positive direct-current voltage being generated in the primary side circuit, and using a negative direct-current voltage in the primary side circuit as a power supply voltage $V_{NEG}$ on a negative side, the negative direct-current voltage being generated in the primary side circuit. The power supply voltage $V_{POS}$ on the positive side (for example, 3 V) is higher than the threshold voltage $V_{TH1}$ (for example, 1.5 V). The power supply voltage $V_{NEG}$ on the negative side (for example, −3 V) is lower than the threshold voltage $V_{TH2}$ (for example, −1.5 V). The power supply voltage $V_{POS}$ on the positive side may be the same as the power supply voltage VCC (see FIG. 2). The power supply voltage $V_{NEG}$ on the negative side may be generated by using a charge pump circuit or other circuits on the basis of the power supply voltage VCC. In the signals SET and IPCNT, the high level has substantially the same potential as the power supply voltage $V_{POS}$, and the low level has substantially the same potential as the ground GND1.

As illustrated in FIG. 6, when the voltage $V_{RX}$ exceeds the threshold voltage $V_{TH1}$ for an infinitesimal time in synchronism with an up edge of the control signal TX, a pulse PLS1 occurs in the signal SET. That is, the pulse PLS1 occurs in the signal SET at intervals of a reciprocal of the frequency $f_{TX}$. Thus, the first control information corresponding to the information regarding the frequency $f_{TX}$ is included in the signal SET. The pulse PLS1 is a part of the signal SET, and corresponds to the signal SET in a high level period of the signal SET. In actuality, there is a slight difference between the up edge timing of the control signal TX and the timing of occurrence of the pulse PLS1 in the signal SET. However, in the following, the presence of the difference will be ignored (it is assumed that the difference does not exist).

On the other hand, when the voltage $V_{RX}$ falls below the threshold voltage $V_{TH2}$ for an infinitesimal time in synchronism with a down edge of the control signal TX, a pulse PLS2 occurs in the signal IPCNT. The pulse PLS2 occurs in timing depending on the pulse width $PW_{TX}$. Thus, the second control information corresponding to the information regarding the pulse width $PW_{TX}$ is included in the signal IPCNT. The pulse PLS2 is a part of the signal IPCNT, and corresponds to the signal IPCNT in a high level period of the signal IPCNT. In actuality, there is a slight difference between the down edge timing of the control signal TX and the timing of occurrence of the pulse PLS2 in the signal IPCNT. However, in the following, the presence of the difference will be ignored (it is assumed that the difference does not exist). Incidentally, in the insulated transmission circuit 30 in FIG. 5, the capacitor CY can be omitted.

In the primary side circuit, the signals SET and IPCNT are supplied to the primary side control circuit 10. Thus, according to the insulated transmission circuit 30, the first and second control information included in the digital control signal TX is transmitted, in an insulated manner, as digital signals (SET and IPCNT) to the primary side control circuit 10.

[Primary Side Control Circuit 10]

Figure 7:
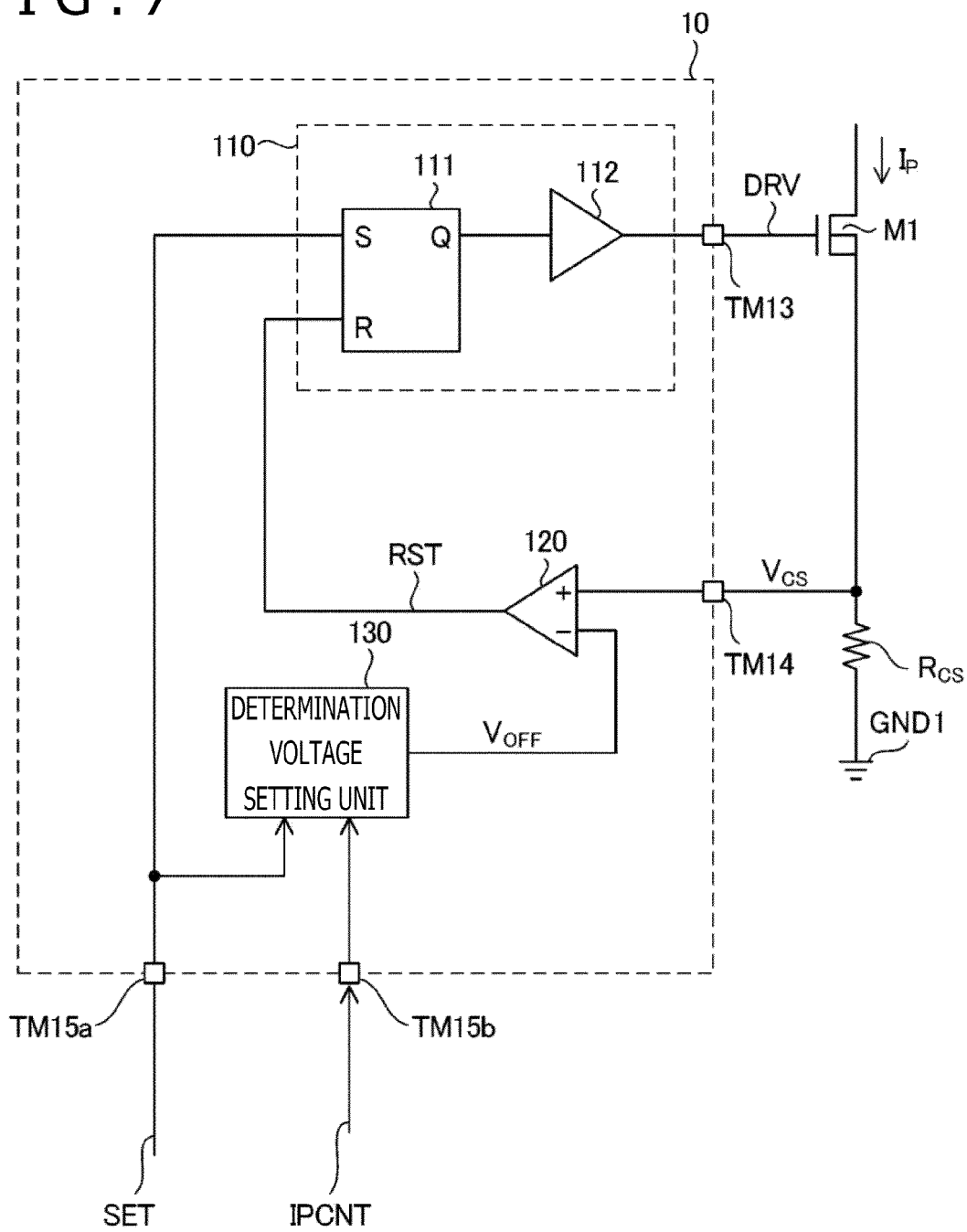
FIG. 7 is a block diagram of a primary side control circuit according to the first embodiment of the present disclosure.

FIG. 7 illustrates an internal configuration of the primary side control circuit 10. The primary side control circuit 10 includes a driving signal generating unit 110, a comparator 120, and a determination voltage setting unit 130. The terminal TM15 in FIG. 2 has two terminals TM15a and TM15b. The signals SET and IPCNT are input to the terminals TM15a and TM15b, respectively.

The driving signal generating unit 110 generates the driving signal DRV to be supplied to the gate of the switching transistor M1 on the basis of the signal SET and a signal RST supplied from the comparator 120. Specifically, the driving signal generating unit 110 in FIG. 7 includes an FF 111 and a driver 112. The FF 111 is an RS flip-flop, and has a set input terminal (S), a reset input terminal (R), and an output terminal (Q). In the FF 111, the signal SET is input to the set input terminal (S), and the signal RST is input to the reset input terminal (R).

The FF 111 latches and retains a logical value of "1" when the signal input to the set input terminal (S) is at a high level and the signal input to the reset input terminal (R) is at a low level. The FF 111 latches and retains a logical value of "0" when the signal input to the set input terminal (S) is at a low level and the signal input to the reset input terminal (R) is at a high level. The FF 111 retains a logical value retained by the FF 111 itself as it is when the signal input to the set input terminal (S) and the signal input to the reset input terminal (R) are both at a low level. In the FF 111, the signals input to the set input terminal (S) and the reset input terminal (R) are not set at a high level at the same time. The FF 111 outputs a signal at a high level from the output terminal (Q) when the logical value retained by the FF 111 itself is "1." The FF 111 outputs a signal at a low level from the output terminal (Q) when the logical value retained by the FF 111 itself is "0." The driver 112 is connected to the gate of the transistor M1 through the terminal TM13. The driver 112 supplies a signal obtained by impedance conversion of the output signal of the FF 111 as the driving signal DRV to the gate of the transistor M1. When the output signal of the FF 111 is at the high level, the driving signal DRV is also at the high level, and therefore the transistor M1 is set in an on state. When the output signal of the FF 111 is at the low level, the driving signal DRV is also at the low level, and therefore the transistor M1 is set in an off state.

A non-inverting input terminal of the comparator 120 is connected to a connection node between the source of the transistor M1 and the sense resistance $R_{CS}$ through the terminal TM14. The non-inverting input terminal of the comparator 120 receives the current sense voltage $V_{CS}$. An inverting input terminal of the comparator 120 is supplied with a determination voltage VOFF. The comparator 120 compares the current sense voltage $V_{CS}$ with the determination voltage $V_{OFF}$, and outputs the signal RST indicating a result of the comparison. Specifically, the comparator 120 sets the signal RST at a high level when the current sense voltage $V_{CS}$ is higher than the determination voltage $V_{OFF}$, and sets the signal RST at a low level when the current sense voltage $V_{CS}$ is lower than the determination voltage $V_{OFF}$. When "$V_{CS}=V_{OFF}$," the signal RST is at either of the high level and the low level, but here, the signal RST is considered to be at the high level. As with the signals SET and IPCNT, the voltages $V_{CS}$ and $V_{OFF}$ and the signals DRV and RST are a voltage or a signal in the primary side circuit, and therefore have a potential as viewed from the ground GND1 (have a potential with the potential of the ground GND1 set at 0 V).

With the above-described configuration, the following unit operation is performed under control of the driving signal generating unit 110. In the unit operation, the driving signal generating unit 110 turns on the transistor M1 by switching the driving signal DRV from the low level to the high level in synchronism with timing of occurrence of the pulse PLS1 in the signal SET, and thereafter turns off the transistor M1 by switching the driving signal DRV from the high level to the low level when the current sense voltage $V_{CS}$ reaches the determination voltage $V_{OFF}$. The unit operation is repeatedly performed in cycles of occurrence of the pulse PLS1. A cycle of occurrence of the pulse PLS1 corresponds to a reciprocal of the frequency $f_{TX}$ of the control signal TX (see FIG. 6). The switching frequency of the transistor M1 therefore coincides with the frequency $f_{TX}$ of the control signal TX. That is, the primary side control circuit 10 controls the switching frequency of the transistor M1 on the basis of the first control information (see FIG. 6) corresponding to the information regarding the frequency $f_{TX}$. A product of a peak value of the primary side current $I_P$ and a resistance value of the sense resistance $R_{CS}$ corresponds to the determination voltage $V_{OFF}$. It can therefore be said that the peak value of the primary side current $I_P$ is determined by the determination voltage $V_{OFF}$.

The determination voltage setting unit 130 variably sets the determination voltage $V_{OFF}$ within a predetermined voltage range on the basis of the above-described second control information. In each cycle of the control signal TX (see FIG. 6), a time length from the occurrence of the pulse PLS1 in the signal SET to the occurrence of the pulse PLS2 in the signal IPCNT represents the pulse width $PW_{TX}$ corresponding to the second control information. Because the second control information is included in the signal IPCNT, the determination voltage $V_{OFF}$ is set on the basis of the signal IPCNT. However, the signal SET needs to be referred to in order to extract the second control information from the signal IPCNT in the primary side circuit. Therefore, the signals SET and IPCNT are input to the determination voltage setting unit 130, and the determination voltage setting unit 130 obtains the second control information (pulse width $PW_{TX}$) from the signal IPCNT while referring to the signal SET. The primary side control circuit 10 sets the determination voltage $V_{OFF}$ on the basis of the second control information corresponding to the pulse width $PW_{TX}$, and thereby controls the peak value of the primary side current $I_P$.

Incidentally, because the signal SET needs to be referred to in order to extract the second control information from the signal IPCNT as described above, the second control information may be construed as being information included in a pair of the signals SET and IPCNT, and the peak value of the primary side current $I_P$ may be construed as being controlled by setting the determination voltage $V_{OFF}$ on the basis of the signals SET and IPCNT.

[Feedback Control]

The feedback control by the above-described configuration will be described. An outline of the feedback control will first be described.

When power consumption of the load LD increases in a state in which the secondary side voltage $V_S$ is stabilized at the target voltage $V_{TG}$, and the secondary side voltage $V_S$ decreases from the target voltage $V_{TG}$, the error voltage $V_{ERR}$ rises. Conversely, when the power consumption of the load LD decreases in a state in which the secondary side voltage $V_S$ is stabilized at the target voltage $V_{TG}$, and the secondary side voltage $V_S$ rises from the target voltage $V_{TG}$, the error voltage $V_{ERR}$ decreases. That is, when the state in which the secondary side voltage $V_S$ is stabilized at the target voltage $V_{TG}$ is regarded as a starting point, an increase in the power consumption of the load LD causes a rise in the error voltage $V_{ERR}$, and a decrease in the power consumption of the load LD causes a decrease in the error voltage $V_{ERR}$.

The control signal generating unit 220 (see FIG. 4) increases the frequency $f_{TX}$ of the control signal TX as the error voltage $V_{ERR}$ is increased, and decreases the frequency $f_{TX}$ of the control signal TX as the error voltage $V_{ERR}$ is decreased. However, an upper limit and a lower limit are set for a variable range of the frequency $f_{TX}$ of the control signal TX. That is, the variable range of the frequency $f_{TX}$ is a range of a predetermined minimum frequency $f_{MIN}$ (for example, 25 kHz) to a predetermined maximum frequency $f_{MAX}$ (for example, 65 kHz), and the control signal generating unit 220 neither sets the frequency $f_{TX}$ lower than the minimum frequency $f_{MIN}$ nor sets the frequency $f_{TX}$ higher than the maximum frequency $f_{MAX}$. Needless to say, the maximum frequency $f_{MAX}$ is higher than the minimum frequency $f_{MIN}$.

In addition, the control signal generating unit 220 (see FIG. 4) performs pulse width adjustment processing that increases the pulse width $PW_{TX}$ of the control signal TX as the error voltage $V_{ERR}$ is increased, and decreases the pulse width $PW_{TX}$ of the control signal TX as the error voltage $V_{ERR}$ is decreased. This pulse width adjustment processing is performed in both a state in which the frequency $f_{TX}$ is lower than the maximum frequency $f_{MAX}$ and a state in which the frequency $f_{TX}$ has reached the maximum frequency $f_{MAX}$. However, an upper limit and a lower limit are set for a variable range of the pulse width $PW_{TX}$ of the control signal TX. That is, the variable range of the pulse width $PW_{TX}$ is a range of a predetermined minimum pulse width $PW_{MIN}$ to a predetermined maximum pulse width $PW_{MAX}$, and the control signal generating unit 220 neither sets the pulse width $PW_{TX}$ smaller than the minimum pulse width $PW_{MIN}$ nor sets the pulse width $PW_{TX}$ larger than the maximum pulse width $PW_{MAX}$. Needless to say, the maximum pulse width $PW_{MAX}$ is larger than the minimum pulse width $PW_{MIN}$.

In the primary side circuit, the transistor M1 is switched at the frequency $f_{TX}$ of the control signal TX. Thus, the heavier the load LD becomes (that is, the larger the power consumption of the load LD becomes), the higher the switching frequency of the transistor M1 becomes through an increase in the frequency $f_{TX}$. In addition, the determination voltage setting unit 130 (see FIG. 7) increases the determination voltage $V_{OFF}$ compared with the current sense voltage $V_{CS}$ in an on period of the transistor M1 as the pulse width $PW_{TX}$ indicated by the second control information is increased. Therefore, the heavier the load LD (that is, the larger the power consumption of the load LD), the higher the energy transmitted from the primary side to the secondary side via the transformer TR in each cycle of switching of the transistor M1. Hence, when the load LD is heavy to a degree that the secondary side voltage $V_S$ is lower than the target voltage $V_{TG}$ in a state in which the frequency $f_{TX}$ of the control signal TX has reached the maximum frequency $f_{MAX}$, the transmitted energy is increased through an increase in the pulse width $PW_{TX}$, so that the secondary side voltage $V_S$ goes to the target voltage $V_{TG}$.

Figure 8:
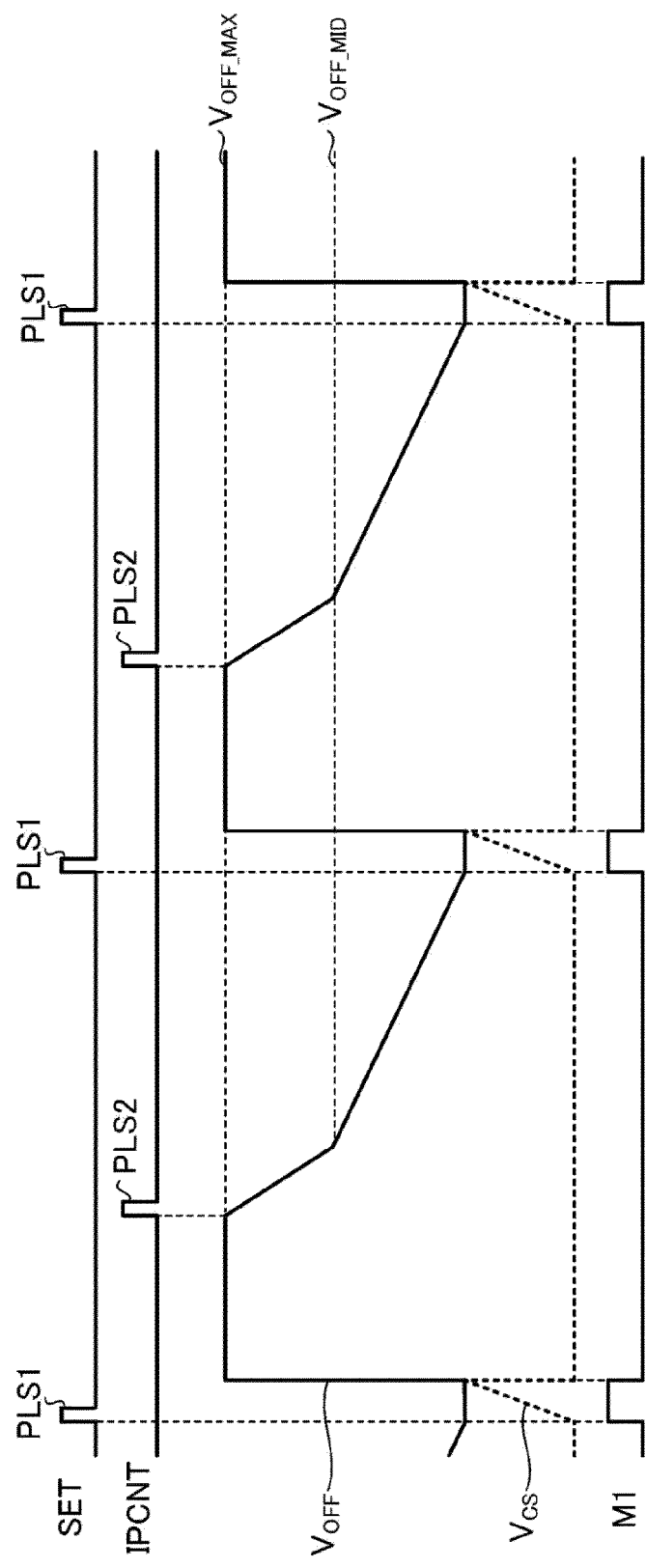
FIG. 8 is a diagram of assistance in explaining a method of varying a determination voltage to be compared with a current sense voltage proportional to a primary side current, the diagram being related to the first embodiment of the present disclosure.

A method of setting the determination voltage $V_{OFF}$ by the determination voltage setting unit 130 will be described with reference to FIG. 8. For the convenience of description, FIG. 8 assumes conditions in which the power consumption of the load LD is relatively small, and as a result, the determination voltage $V_{OFF}$ in an on period of the transistor M1 is set relatively low. As described above, the determination voltage setting unit 130 variably sets the determination voltage $V_{OFF}$ within a predetermined voltage range, and the voltage range is a range of a predetermined minimum voltage $V_{OFF\_MIN}$ to a predetermined maximum voltage $V_{OFF\_MAX}$ ($0<V_{OFF\_MIN}<V_{OFF\_MAX}$). FIG. 8 does not illustrate the minimum voltage $V_{OFF\_MIN}$. Instead, a predetermined intermediate voltage $V_{OFF\_MID}$ satisfying "$0<V_{OFF\_MIN}<V_{OFF\_MID}<V_{OFF\_MAX}$" is illustrated. For example, "$V_{OFF\_MID}=V_{OFF\_MAX}\times 0.7$" and "$V_{OFF\_MIN}=V_{OFF\_MAX}\times 0.3$." The voltages $V_{OFF\_MIN}$, $V_{OFF\_MID}$, and $V_{OFF\_MAX}$ are positive voltages as viewed from the potential of the ground GND1.

Variations in the determination voltage $V_{OFF}$ will be described with an on period of the transistor M1 as a starting point. The determination voltage setting unit 130 fixes the voltage value of the determination voltage $V_{OFF}$ in the on period of the transistor M1. Then, an up edge of the signal RST occurs when "$V_{CS}>V_{OFF}$" or "$V_{CS}\geq V_{OFF}$" in the on period of the transistor M1. The determination voltage setting unit 130 sharply raises the determination voltage $V_{OFF}$ to the maximum voltage $V_{OFF\_MAX}$ with the occurrence of the up edge of the signal RST as a trigger. Meanwhile, the driving signal generating unit 110 turns off the transistor M1 on the basis of the up edge of the signal RST. Thereafter, the determination voltage $V_{OFF}$ is maintained at the maximum voltage $V_{OFF\_MAX}$ until a pulse PLS2 occurs in the signal IPCNT in an off period of the transistor M1. When a pulse PLS2 occurs in the signal IPCNT in the off period of the transistor M1, the determination voltage setting unit 130 decreases the determination voltage $V_{OFF}$ according to a predetermined rule with timing of the occurrence of the pulse PLS2 as a starting point.

In an example according to the present embodiment, first, with the timing of occurrence of the pulse PLS2 as a starting point, the determination voltage $V_{OFF}$ is monotonically decreased from the maximum voltage $V_{OFF\_MAX}$ to the intermediate voltage $V_{OFF\_MID}$ at a first voltage decrease rate. When the determination voltage $V_{OFF}$ is decreased to the intermediate voltage $V_{OFF\_MID}$, the determination voltage setting unit 130 monotonically decreases the determination voltage $V_{OFF}$ from the intermediate voltage $V_{OFF\_MID}$ to the minimum voltage $V_{OFF\_MIN}$ at a second voltage decrease rate. When a pulse PLS1 occurs in the signal SET in a process of this decrease, a next on period of the transistor M1 is started, and therefore the decreasing of the determination voltage $V_{OFF}$ is stopped.

A state in which the determination voltage $V_{OFF}$ is decreased to the minimum voltage $V_{OFF\_MIN}$ corresponds to a state in which the frequency $f_{TX}$ of the control signal TX (hence, the switching frequency of the transistor M1) coincides with the minimum frequency $f_{MIN}$ (for example, 25 kHz). That is, the first and second voltage decrease rates and the voltages $V_{OFF\_MAX}$, $V_{OFF\_MID}$, and $V_{OFF\_MIN}$ are determined such that the determination voltage $V_{OFF}$ is decreased to precisely the minimum voltage $V_{OFF\_MIN}$ immediately before a pulse PLS1 occurs in the signal SET in a state in which "$f_{TX}=f_{MIN}$." Incidentally, the first voltage decrease rate is higher than the second voltage decrease rate. However, a modification in which the first voltage decrease rate and the second voltage decrease rate are set to be the same or a modification in which the second voltage decrease rate is set higher than the first voltage decrease rate is also possible. In addition, the above-described predetermined rule that decreases the determination voltage $V_{OFF}$ can be modified variously.

FIG. 8 assumes that no pulse PLS1 occurs in the signal SET before the determination voltage $V_{OFF}$ is decreased to the intermediate voltage $V_{OFF\_MID}$ in the off period of the transistor M1. The behavior of the determination voltage $V_{OFF}$ has been described under this assumption. However, the assumption is violated depending on the state of the load LD. When a pulse PLS1 occurs in the signal SET before the determination voltage $V_{OFF}$ is decreased to the intermediate voltage $V_{OFF\_MID}$ in the off period of the transistor M1, the determination voltage setting unit 130 stops decreasing the determination voltage $V_{OFF}$ at a time point of the occurrence of the pulse PLS1 (hence, stops decreasing the determination voltage $V_{OFF}$ in a state in which "$V_{OFF}>V_{OFF\_MID}$;" see FIG. 10). In this case, the determination voltage $V_{OFF}$ higher than the intermediate voltage $V_{OFF\_MID}$ is set in the on period of the transistor M1 which on period starts from the time point of the occurrence of the pulse PLS1.

Figure 9:
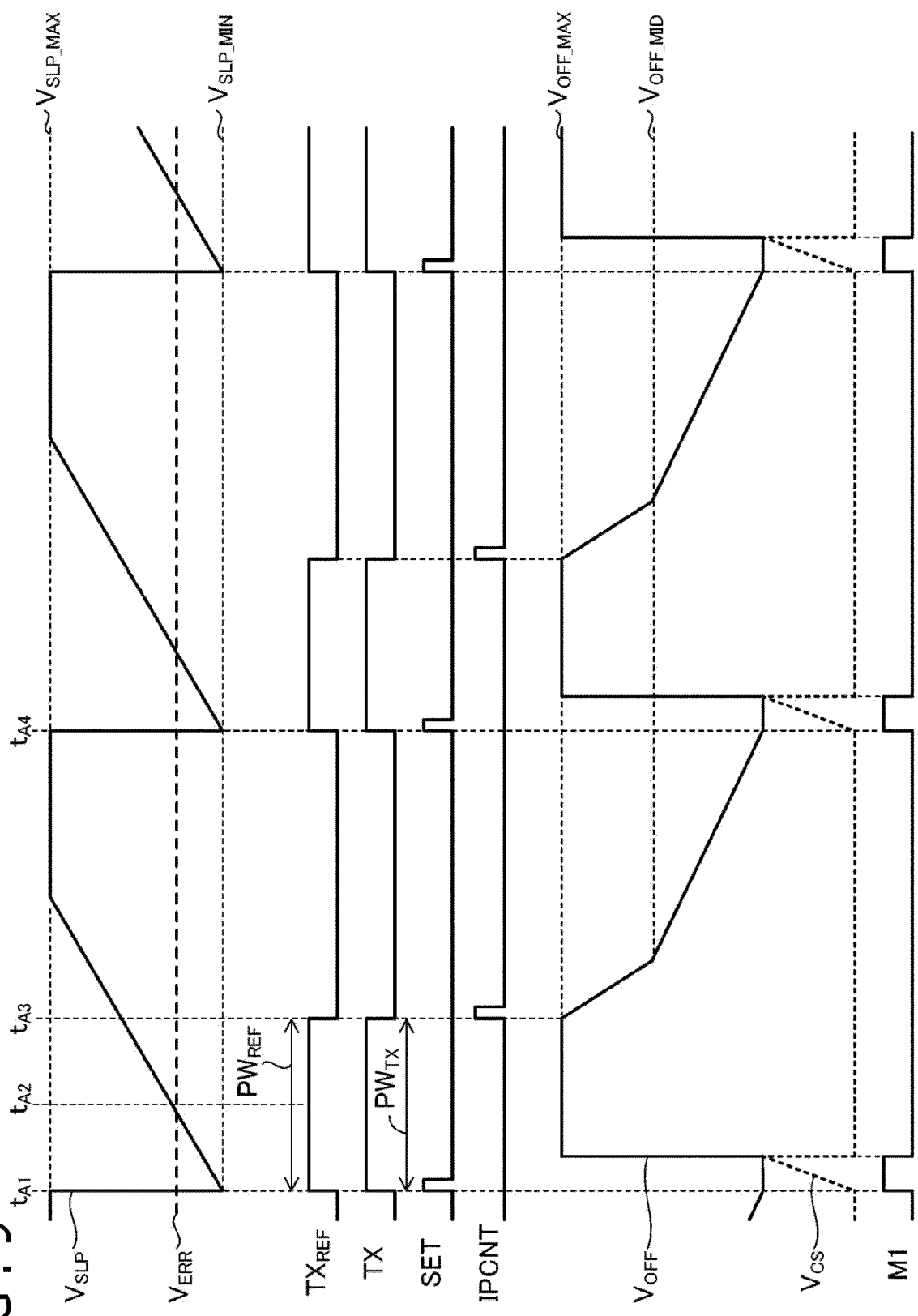
FIG. 9 is a waveform chart of voltages and signals and the like in a case where a secondary side voltage is stabilized at a target voltage in a state in which the power consumption of a load is relatively small, the waveform chart being related to the first embodiment of the present disclosure.

FIG. 9 illustrates the waveforms of respective voltages and signals and the like in a case where the secondary side voltage $V_S$ is stabilized at the target voltage $V_{TG}$ in a state in which the power consumption of the load LD is relatively small. Suppose that timings $t_{41}$, $t_{42}$, $t_{43}$, and $t_{44}$ arrive in this order with the passage of time. A length between the timings $t_{41}$ and $t_{44}$ corresponds to the length of one cycle of the control signal TX in the case of FIG. 9.

As described above, the slope voltage $V_{SLP}$ is a voltage varying within a predetermined slope variable range. The slope variable range is a range of a predetermined minimum voltage $V_{SLP\_MIN}$ to a predetermined maximum voltage $V_{SLP\_MAX}$ ($0<V_{SLP\_MIN}<V_{SLP\_MAX}$). The voltages $V_{SLP\_MIN}$ and $V_{SLP\_MAX}$ are positive voltages as viewed from the potential of the ground GND2. The error voltage $V_{ERR}$ varies within a voltage range higher than the minimum voltage $V_{SLP\_MIN}$ and lower than the maximum voltage $V_{SLP\_MAX}$. However, there may be conditions in which the error voltage $V_{ERR}$ is equal to or higher than the maximum voltage $V_{SLP\_MAX}$.

The control signal generating unit 220 (see FIG. 4) generates an internal signal $TX_{REF}$, and generates the control signal TX while referring to the internal signal $TX_{REF}$. As with the control signal TX, the internal signal $TX_{REF}$ is a rectangular wave signal assuming a signal level of a low level or a high level. The frequency of the internal signal $TX_{REF}$ is the same as the frequency $f_{TX}$ of the control signal TX. An up edge of the internal signal $TX_{REF}$ and an up edge of the control signal TX occur at the same time. However, depending on the error voltage $V_{ERR}$, the pulse width $PW_{TX}$ of the control signal TX may coincide with a pulse width $PW_{REF}$ of the internal signal $TX_{REF}$ or become larger than the pulse width $PW_{REF}$. Hence, the pulse width $PW_{REF}$ of the internal signal $TX_{REF}$ corresponds to the minimum pulse width $PW_{MIN}$ of the control signal TX. The pulse width $PW_{REF}$ has a fixed predetermined time (that is, the length of the pulse width $PW_{REF}$ is fixed and coincides with a predetermined time length). The period of one cycle of the internal signal $TX_{REF}$ includes a high level period of the internal signal $TX_{REF}$ and a low level period of the internal signal $TX_{REF}$ which low level period is adjacent to the high level period. The pulse width $PW_{REF}$ of the internal signal $TX_{REF}$ refers to the length of the high level period of the internal signal $TX_{REF}$ in each cycle of the internal signal $TX_{REF}$. A length between the timings $t_{41}$ and $t_{43}$ in FIG. 9 coincides with the pulse width $PW_{REF}$.

The control signal generating unit 220 sets the frequency $f_{TX}$ of the control signal TX according to the error voltage $V_{ERR}$, and generates simultaneous up edges in the signals $TX_{REF}$ and TX at intervals of a reciprocal of the frequency $f_{TX}$. With regard to the case of FIG. 9, attention will be directed to a certain up edge timing $t_{41}$ in the signals $TX_{REF}$ and TX. The slope voltage generating unit 221 (see FIG. 4) sets the slope voltage $V_{SLP}$ to the minimum voltage $V_{SLP\_MIN}$ in the up edge timing $t_{A1}$ of the signals $TX_{REF}$ and TX, and monotonically increases the slope voltage $V_{SLP}$ from the minimum voltage $V_{SLP\_MIN}$ to the maximum voltage $V_{SLP\_MAX}$ at a predetermined voltage increase rate with the timing $t_{A1}$ as a starting point. In the case illustrated in FIG. 9, in a process from the up edge timing $t_{A1}$ of the signals $TX_{REF}$ and TX to the next up edge timing $t_{A4}$ of the signals $TX_{REF}$ and TX, the slope voltage $V_{SLP}$ reaches the maximum voltage $V_{SLP\_MAX}$. In this case, the changing of the slope voltage $V_{SLP}$ is stopped at a time point that the slope voltage $V_{SLP}$ reaches the maximum voltage $V_{SLP\_MAX}$.

The control signal generating unit 220 compares the error voltage $V_{ERR}$ and the slope voltage $V_{SLP}$ with each other after the timing $t_{A1}$, and detects the timing $t_{A2}$ of switching from a state of "$V_{ERR}>V_{SLP}$" to a state of "$V_{ERR}<V_{SLP}$" on the basis of a result of the comparison. When the timing $t_{A2}$ is timing within the high level period of the internal signal $TX_{REF}$, the control signal generating unit 220 generates a down edge of the control signal TX at the same time as a down edge of the internal signal $TX_{REF}$. FIG. 9 corresponds to such a condition, in which down edges of the signals $TX_{REF}$ and TX occur in the timing $t_{A3}$ in which the time of the pulse width $PW_{REF}$ has passed from the timing $t_{A1}$. Thereafter, next up edges of the signals $TX_{REF}$ and TX occur in the timing $t_{A4}$ in which the time of a reciprocal of the frequency $f_{TX}$ has passed from the timing $t_{A1}$. An operation similar to that in the cycle starting with the timing $t_{A1}$ is performed in a cycle starting with the timing $t_{A4}$ and each of subsequent cycles.

Figure 10:
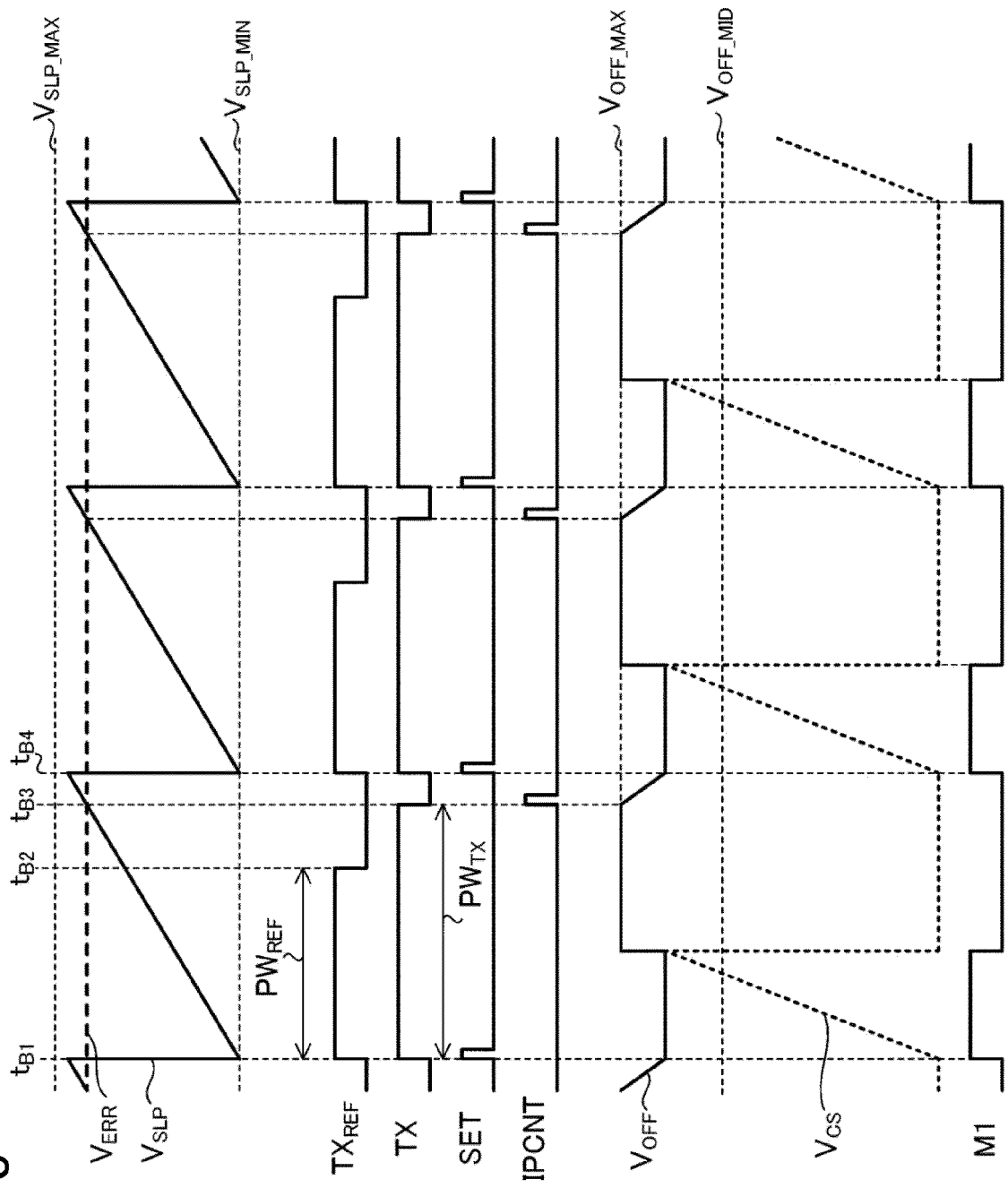
FIG. 10 is a waveform chart of voltages and signals and the like in a case where the secondary side voltage is stabilized at the target voltage in a state in which the power consumption of the load is relatively large, the waveform chart being related to the first embodiment of the present disclosure.

FIG. 10 illustrates the waveforms of respective voltages and signals and the like in a case where the secondary side voltage $V_S$ is stabilized at the target voltage $V_{TG}$ in a state in which the power consumption of the load LD is relatively large. The power consumption of the load LD in the case of FIG. 10 is larger than that in the case of FIG. 9. Suppose that timings $t_{B1}$, $t_{B2}$, $t_{B3}$, and $t_{B4}$ arrive in this order with the passage of time. A length between the timings $t_{B1}$ and $t_{B4}$ corresponds to the length of one cycle of the control signal TX in the case of FIG. 10.

The control signal generating unit 220 sets the frequency $f_{TX}$ of the control signal TX according to the error voltage VERB, and generates simultaneous up edges in the signals $TX_{REF}$ and TX at intervals of a reciprocal of the frequency $f_{TX}$. With regard to the case of FIG. 10, attention will be directed to a certain up edge timing $t_{B1}$ in the signals $TX_{REF}$ and TX. The slope voltage generating unit 221 (see FIG. 4) sets the slope voltage $V_{SLP}$ to the minimum voltage $V_{SLP\_MIN}$ in the up edge timing $t_{B1}$ of the signals $TX_{REF}$ and TX, and monotonically increases the slope voltage $V_{SLP}$ from the minimum voltage $V_{SLP\_MIN}$ to the maximum voltage $V_{SLP\_MAX}$ at a predetermined voltage increase rate with the timing $t_{B1}$ as a starting point. In the case illustrated in FIG. 10, after the up edge timing $t_{B1}$ of the signals $TX_{REF}$ and TX, the next up edge timing $t_{B4}$ of the signals $TX_{REF}$ and TX occurs before the slope voltage $V_{SLP}$ reaches the maximum voltage $V_{SLP\_MAX}$.

The control signal generating unit 220 compares the error voltage $V_{ERR}$ and the slope voltage $V_{SLP}$ with each other after the timing $t_{B1}$, and detects the timing $t_{B3}$ of switching from a state of "$V_{ERR}>V_{SLP}$" to a state of "VERB<$V_{SLP}$" on the basis of a result of the comparison. When the timing $t_{B3}$ is timing within the low level period of the internal signal $TX_{REF}$, the control signal generating unit 220 generates a down edge of the control signal TX in the timing $t_{B3}$. FIG. 10 corresponds such a condition. A down edge therefore occurs in the control signal TX in the timing $t_{B3}$. A length between the timings $t_{B1}$ and $t_{B2}$ in FIG. 10 coincides with the pulse width $PW_{REF}$. In the case of FIG. 10, a down edge occurs in the internal signal $TX_{REF}$ in timing $t_{B2}$, and a down edge occurs in the control signal TX in the following timing $t_{B3}$. After the timing $t_{B3}$, next up edges of the signals $TX_{REF}$ and TX occur in the timing $t_{B4}$ in which the time of a reciprocal of the frequency $f_{TX}$ has passed from the timing $t_{B1}$. An operation similar to that in the cycle starting with the timing $t_{B1}$ is performed in a cycle starting with the timing $t_{B4}$ and each of subsequent cycles.

Thus, in each cycle of the control signal TX, the control signal generating unit 220 detects timing ($t_{A2}$ or $t_{B3}$) in which switching is performed from a state of "$V_{ERR}>V_{SLP}$" to a state of "$V_{ERR}<V_{SLP}$." When the detected timing is timing within the high level period of the internal signal $TX_{REF}$, the control signal generating unit 220 generates a down edge of the control signal TX at the same time as a down edge of the internal signal $TX_{REF}$ (see FIG. 9). When the detected timing is timing within the low level period of the internal signal $TX_{REF}$, the control signal generating unit 220 generates a down edge of the control signal TX in the detected timing (see FIG. 10). It is thereby possible to set the pulse width $PW_{TX}$ variably according to the error voltage $V_{ERR}$ while ensuring that the pulse width $PW_{TX}$ is equal to or more than the minimum pulse width ($PW_{REF}$).

Incidentally, in each cycle of the control signal TX, a lower limit time is set for the length of the low level period of the control signal TX. For convenience, timing preceding the timing $t_{B4}$ in FIG. 10 by the lower limit time will be referred to as forced low timing. In the case of FIG. 10, even if "$V_{ERR}<V_{SLP}$" does not hold until the forced low timing, the control signal generating unit 220 generates a down edge in the control signal TX in the forced low timing.

Figure 11:
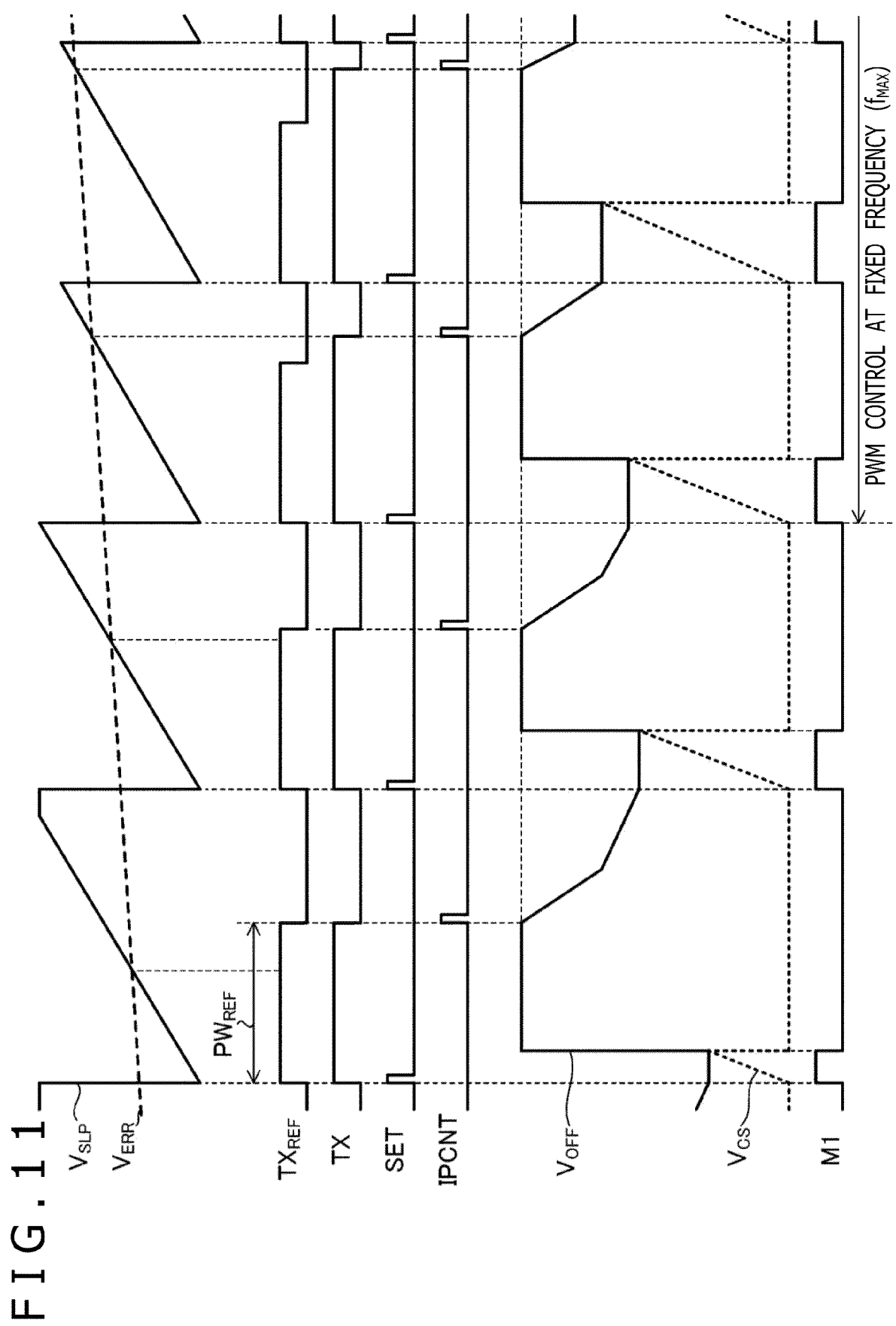
FIG. 11 is a waveform chart of voltages and signals and the like in a transient state in which an error voltage increases gradually, the waveform chart being related to the first embodiment of the present disclosure.

FIG. 11 illustrates the waveforms of respective voltages and signals and the like in a transient state in which the error voltage $V_{ERR}$ gradually increases because the secondary side voltage $V_S$ is lower than the target voltage $V_{TG}$. With the increase in the error voltage $V_{ERR}$, the frequency $f_{TX}$ of the control signal TX gradually increases, and ultimately reaches the maximum frequency $f_{MAX}$. Meanwhile, with the increase in the error voltage $V_{ERR}$, the pulse width $PW_{TX}$ of the control signal TX gradually increases with the pulse width $PW_{REF}$ as a lower limit. Therefore, after the frequency $f_{TX}$ of the control signal TX (hence, the switching frequency of the transistor M1) reaches the maximum frequency $f_{MAX}$, the determination voltage $V_{OFF}$ is adjusted according to the error voltage $V_{ERR}$ (the peak value of the primary side current $I_P$ in the on period of the transistor M1 is adjusted). This corresponds to the switching driving of the transistor M1 by PWM control according to the error voltage $V_{ERR}$.

In a case where the feedback control is realized by transmitting the control signal as a digital signal from the secondary side to the primary side, it is possible to generate the control signal according to the secondary side voltage $V_S$, and switch the transistor M1 in synchronism with the control signal. At this time, the switching frequency on the primary side (switching frequency of the transistor M1) coincides with the frequency of the control signal. However, there is a fear that merely controlling the switching frequency by the control signal cannot achieve the control when the frequency of the control signal reaches a maximum operating frequency on the primary side. In consideration of this, the present embodiment generates the first control information regarding the frequency and the different second control information in the secondary side control circuit 20 on the basis of the secondary side voltage $V_S$, transmits the first and second control information to the primary side control circuit 10, and in the primary side control circuit 10, controls the switching frequency of the transistor M1 on the basis of the first control information and controls the peak value of the primary side current $I_P$ on the basis of the second control information. Consequently, even after the frequency of the control signal TX reaches the maximum operating frequency (corresponding to the frequency $f_{MAX}$), the feedback control functions effectively (PWM control is performed at the frequency $f_{MAX}$; see FIG. 11) due to the adjustment of the peak value of the primary side current $I_P$ on the basis of the second control information. A stable secondary side voltage $V_S$ can therefore be obtained.

Incidentally, the configuration according to the present embodiment has a high response speed and can reduce a circuit area as compared with such a configuration as uses a PLL system. In addition, jitter for spreading a frequency spectrum can be determined on the secondary side (jitter is realized easily).

Second Embodiment

A second embodiment of the present disclosure will be described. The second embodiment is an embodiment based on the first embodiment. As for items not particularly described in the second embodiment, description in the first embodiment is applied also to the second embodiment as long as there is no contradiction. In interpreting the description of the second embodiment, the description of the second embodiment may be given priority with regard to items contradicting between the first and second embodiments.

The insulated element provided to the insulated transmission circuit 30 in order to transmit the above-described first and second control information from the secondary side to the primary side is not limited to a capacitor. The insulated element can freely be selected as long as the transmission can be realized. The second embodiment uses a pulse transformer as the insulated element. As a pulse transformer is used as the insulated element, the circuit configuration within the DC/DC converter 4 is partially changed from that of the first embodiment. This change will be described in the following.

FIG. 12 illustrates an example of a configuration of an insulated transmission circuit 30a according to the second embodiment. The second embodiment uses the insulated transmission circuit 30a as the insulated transmission circuit 30 in FIG. 2. The control signal TX is input to the insulated transmission circuit 30a. The insulated transmission circuit 30a is provided with a block for transmitting the first control information from the primary side to the secondary side and a block for transmitting the second control information from the primary side to the secondary side. The former block includes a transmitting unit 361, a pulse transformer 362, and a receiving unit 363, while the latter block includes a transmitting unit 371, a pulse transformer 372, and a receiving unit 373.

The pulse transformer 362 includes a primary side winding 362_1 and a secondary side winding 362_2 magnetically coupled to each other while insulated from each other. The pulse transformer 372 includes a primary side winding 372_1 and a secondary side winding 372_2 magnetically coupled to each other while insulated from each other. The primary side windings 362_1 and 372_1 are arranged within the primary side circuit. The secondary side windings 362_2 and 372_2 are arranged within the secondary side circuit.

Both terminals of the secondary side winding 362_2 are connected to the transmitting unit 361. Only one of both terminals of the secondary side winding 362_2 is connected to the ground GND2. Both terminals of the secondary side winding 372_2 are connected to the transmitting unit 371. Only one of both terminals of the secondary side winding 372_2 is connected to the ground GND2. Both terminals of the primary side winding 362_1 are connected to the receiving unit 363. Only one of both terminals of the primary side winding 362_1 is connected to the ground GND1. Both terminals of the primary side winding 372_1 are connected to the receiving unit 373. Only one of both terminals of the primary side winding 372_1 is connected to the ground GND1.

The transmitting unit 361 outputs a transmission pulse signal TP1 to the secondary side winding 362_2 of the pulse transformer 362 in synchronism with up edges of the control signal TX. Outputting the transmission pulse signal TP1 to the secondary side winding 362_2 means imparting a change to a current flowing through the secondary side winding 362_2 by supplying a pulsed voltage based on the transmission pulse signal TP1 to the secondary side winding 362_2. A method of supplying the pulsed voltage can freely be selected as long as a change occurs in the current flowing through the secondary side winding 362_2. The change in the current generates a pulsed voltage in the primary side winding 362_1. The transmitting unit 361 outputs the transmission pulse signal TP1 such that the pulsed voltage occurs in the primary side winding 362_1 in up edge timing of the control signal TX.

The receiving unit 363 generates a signal SET as a received signal on the basis of the voltage generated in the primary side winding 362_1. The signal SET generated here is equivalent to the signal SET generated in the insulated transmission circuit 30 according to the first embodiment (FIG. 5). The receiving unit 363, for example, includes a first comparator. The receiving unit 363 compares the magnitude of the voltage across the primary side winding 362_1 with a predetermined threshold voltage by using the first comparator. When the magnitude of the voltage across the primary side winding 362_1 is equal to or higher than the threshold voltage, the receiving unit 363 includes a pulse PLS1 having a high level for an infinitesimal time in the signal SET (see FIG. 6). As a result, relation between the control signal TX and the signal SET is equivalent to that described in the first embodiment (see FIG. 6).

The transmitting unit 371 outputs a transmission pulse signal TP2 to the secondary side winding 372_2 of the pulse transformer 372 in synchronism with down edges of the control signal TX. Outputting the transmission pulse signal TP2 to the secondary side winding 372_2 means imparting a change to a current flowing through the secondary side winding 372_2 by supplying a pulsed voltage based on the transmission pulse signal TP2 to the secondary side winding 372_2. A method of supplying the pulsed voltage can freely be selected as long as a change occurs in the current flowing through the secondary side winding 372_2. The change in the current generates a pulsed voltage in the primary side winding 372_1. The transmitting unit 371 outputs the transmission pulse signal TP2 such that the pulsed voltage occurs in the primary side winding 372_1 in down edge timing of the control signal TX.

The receiving unit 373 generates a signal IPCNT as a received signal on the basis of the voltage generated in the primary side winding 372_1. The signal IPCNT generated here is equivalent to the signal IPCNT generated in the insulated transmission circuit 30 according to the first embodiment (FIG. 5). The receiving unit 373, for example, includes a second comparator. The receiving unit 373 compares the magnitude of the voltage across the primary side winding 372_1 with a predetermined threshold voltage by using the second comparator. When the magnitude of the voltage across the primary side winding 372_1 is equal to or higher than the threshold voltage, the receiving unit 373 includes a pulse PLS2 having a high level for an infinitesimal time in the signal IPCNT (see FIG. 6). As a result, relation between the control signal TX and the signal IPCNT is equivalent to that described in the first embodiment (see FIG. 6).

The second embodiment can provide actions and effects similar to those of the first embodiment. However, in a case where a pulse transformer is used as an insulated element in transmitting a signal that can be recognized on the primary side, a consumed current is increased as compared with a case where a capacitor is used as in the first embodiment. In addition, in a case where a pulse transformer is used as an insulated element, as compared with a case where a capacitor is used as in the first embodiment, the peak value of a received signal on the primary side is low, so that the received signal is affected by noise easily and a delay in transmission from the secondary side to the primary side tends to become large. Thus, a configuration using a capacitor as an insulated element as in the first embodiment is often preferable.

Third Embodiment

A third embodiment of the present disclosure will be described. In the third embodiment, description will be made of applied technologies, modified technologies, and the like applicable to the first and second embodiments.

The use of the DC/DC converter 4 as a constituent element of the AC/DC converter 1 has been described above. However, the DC/DC converter 4 may receive, as the primary side voltage $V_P$, an output voltage of any voltage source (for example, a battery) that generates a direct-current voltage, and generate the secondary side voltage $V_S$.

A semiconductor device SMC1 (not illustrated) may be formed which has the primary side control circuit 10, the secondary side control circuit 20, and the insulated transmission circuit (30 or 30a) integrated on a semiconductor substrate of one chip. The semiconductor device SMC1 is formed by housing and sealing a semiconductor substrate of one chip having the primary side control circuit 10, the secondary side control circuit 20, and the insulated transmission circuit (30 or 30a) integrated thereon in a package (casing) formed of a resin.

Alternatively, a semiconductor device SMC2 (not illustrated) may be formed by producing a first chip having the primary side control circuit 10 integrated on a first semiconductor substrate, a second chip having the secondary side control circuit 20 integrated on a second semiconductor substrate, and a third chip having the insulated transmission circuit (30 or 30a) integrated on a third semiconductor substrate, and housing and sealing the first to third chips in a common package (casing).

The primary side control circuit 10 and the secondary side control circuit 20 may be formed as separate semiconductor devices. Specifically, a semiconductor device $SMC3_A$ (not illustrated) may be formed by housing and sealing a first chip having the primary side control circuit 10 integrated on a first semiconductor substrate in a first package, and a semiconductor device $SMC3_B$ (not illustrated) may be separately formed by housing and sealing a second chip having the secondary side control circuit 20 integrated on a second semiconductor substrate in a second package. In this case, the insulated transmission circuit (30 or 30a) may be formed in a discrete part provided separately from the semiconductor devices $SMC3_A$ and $SMC3_B$, or a semiconductor device $SMC3_C$ may be formed by housing and sealing a third chip having the insulated transmission circuit (30 or 30a) integrated on a third semiconductor substrate in a third package.

The switching transistor M1 may be further integrated and included in the semiconductor device (SM1, SMC2, or $SMC3_A$) having the primary side control circuit 10 integrated therein, and the sense resistance $R_{CS}$ may be further integrated and included in the semiconductor device (SM1, SMC2, or $SMC3_A$) having the primary side control circuit 10 integrated therein.

With regard to any signal or voltage, relation between a high level and a low level thereof may be reversed in a form in which the above-described gist is not compromised. In addition, the channel type of a FET can be changed optionally in a form in which the above-described gist is not compromised. Specifically, for example, the configuration of the DC/DC converter 4 may be modified such that the switching transistor M1 is configured as a P-channel type MOSFET.

The above-described given transistor may be any type of transistor. For example, the given transistor described above as a MOSFET (for example, the switching transistor M1 in particular) can be replaced with a junction FET, an insulated gate bipolar transistor (IGBT), or a bipolar transistor. The given transistor has a first electrode, a second electrode, and a control electrode. In a FET, one of the first and second electrodes is a drain, the other is a source, and the control electrode is a gate. In an IGBT, one of the first and second electrodes is a collector, the other is an emitter, and the control electrode is a gate. In a bipolar transistor not belonging to the IGBT, one of the first and second electrodes is a collector, the other is an emitter, and the control electrode is a base.

SUPPLEMENTARY NOTES

A configuration of the present disclosure embodied in each of the foregoing embodiments will be added in the following.

An isolated DC/DC converter according to an aspect of the present disclosure has a configuration $X_1$ of an isolated DC/DC converter (4) for generating a secondary side voltage ($V_S$) on a secondary side from a primary side voltage ($V_P$) on a primary side by using a power transformer (TR) having a primary side winding (W1) and a secondary side winding (W2) insulated from each other, the isolated DC/DC converter including a primary side control circuit (10) disposed on the primary side and that switches a switching element (M1) connected in series with the primary side winding; a secondary side control circuit (20) disposed on the secondary side and that generates a control signal (TX) including first control information and second control information on the basis of the secondary side voltage; and an insulated transmission circuit (30 or 30a) that transmits, in an insulated manner, each piece of control information included in the control signal to the primary side control circuit; the primary side control circuit controlling a switching frequency of the switching element on the basis of the first control information, and controlling a peak value of a primary side current flowing through the primary side winding through the switching element on the basis of the second control information.

Specifically, for example, the isolated DC/DC converter according to the configuration $X_1$ may have a configuration $X_2$ in which the secondary side control circuit includes an error voltage generating unit (210) that generates an error voltage ($V_{ERR}$) corresponding to a difference between a feedback voltage ($V_{FB}$) corresponding to the secondary side voltage and a predetermined reference voltage ($V_{REF}$) and a control signal generating unit (220) that generates the control signal (TX) on the basis of the error voltage and a slope voltage ($V_{SLP}$) that varies within a predetermined range.

Further, specifically, for example, the isolated DC/DC converter according to the configuration $X_2$ may have a configuration $X_3$ in which the control signal (TX) has information regarding a frequency corresponding to the error voltage as the first control information, and has information corresponding to a result of comparison between the error voltage and the slope voltage as the second control information.

Further, specifically, for example, the isolated DC/DC converter according to the configuration $X_3$ may have a configuration $X_4$ in which the control signal generating unit generates, as the control signal, a signal having the frequency corresponding to the error voltage and having a pulse width corresponding to the result of the comparison between the error voltage and the slope voltage, the first control information is information regarding the frequency ($f_{TX}$) of the control signal and the second control information is information regarding the pulse width ($PW_{TX}$) of the control signal, the insulated transmission circuit generates a first received signal (SET) having the first control information and a second received signal (IPCNT) having the second control information on the primary side by transmitting the first and second control information to the primary side by using an insulated element disposed between the primary side and the secondary side, and the primary side control circuit controls the switching frequency of the switching element and controls the peak value of the primary side current flowing through the primary side winding through the switching element, on the basis of the first and second received signals.

Further, specifically, for example, the isolated DC/DC converter according to the configuration $X_4$ may have a configuration $X_5$ in which the control signal is a rectangular wave signal assuming a signal level of a first level (for example, a low level) or a second level (for example, a high level), a length of a period in which the signal level of the control signal is the second level corresponds to the pulse width ($PW_{TX}$) of the control signal in each cycle of the control signal, the control signal generating unit makes the signal level of the control signal make a transition from the first level to the second level at the frequency corresponding to the error voltage, and makes the signal level of the control signal make a transition from the second level to the first level on the basis of the result of the comparison between the error voltage and the slope voltage in each cycle of the control signal, the cycle starting in transition timing from the first level to the second level, using the insulated element, the insulated transmission circuit generates the first received signal (SET) including a pulse synchronous with the transition from the first level to the second level of the signal level of the control signal on the primary side, and generates the second received signal (IPCNT) including a pulse synchronous with the transition from the second level to the first level of the signal level of the control signal on the primary side, and the primary side control circuit includes a determination voltage setting unit (130) that sets a determination voltage ($V_{OFF}$) variably within a predetermined voltage range on the basis of the second received signal, and turns off the switching element when a current sense voltage ($V_{CS}$) proportional to the primary side current reaches the determination voltage after turning on the switching element in synchronism with timing of the pulse in the first received signal.

Further, specifically, for example, the isolated DC/DC converter according to the configuration $X_5$ may have a configuration $X_6$ in which the control signal generating unit makes the signal level of the control signal make a transition from the first level (for example, the low level) to the second level (for example, the high level) at the frequency corresponding to the error voltage, the slope voltage monotonically changes in a predetermined direction (for example, a rising direction) from a predetermined initial voltage (for example, $V_{SLP\_MIN}$) in each cycle of the control signal, the cycle starting in the transition timing, and when magnitude relation between the error voltage and the slope voltage is reversed before passage of a predetermined time (corresponding to the length of the pulse width $PW_{REF}$) from the transition timing, the control signal generating unit makes the signal level of the control signal make a transition from the second level to the first level in timing succeeding the transition timing by the predetermined time (see FIG. 9), and when the magnitude relation is reversed after the passage of the predetermined time from the transition timing, the control signal generating unit makes the signal level of the control signal make a transition from the second level to the first level in timing of the reversal (see FIG. 10).

In addition, for example, the isolated DC/DC converter according to the configuration $X_5$ or $X_6$ may have a configuration $X_7$ in which the determination voltage setting unit fixes the determination voltage until the switching element is turned off after the switching element is turned on in synchronism with the pulse in the first received signal, sets the determination voltage to a maximum voltage ($V_{OFF\_MAX}$) within the voltage range when the switching element is turned off, then decreases the determination voltage from the maximum voltage within the voltage range according to a predetermined rule with the pulse in the second received signal as a trigger (corresponding to the timing $t_{A3}$ in FIG. 9 or corresponding to the timing $t_{B3}$ in FIG. 10), and stops decreasing the determination voltage when a next pulse occurs in the first received signal (in correspondence with the timing $t_{A4}$ in FIG. 9 or in correspondence with the timing $t_{B4}$ in FIG. 10).

In addition, for example, the isolated DC/DC converter according to one of the configurations $X_4$ to $X_7$ may have a configuration $X_8$ in which the insulated element is formed by a capacitor (for example, including the capacitor CA in FIG. 5).

Alternatively, for example, the isolated DC/DC converter according to one of the configurations $X_5$ to $X_7$ may have a configuration $X_9$ in which the insulated element is formed by a capacitor (for example, including the capacitor CA in FIG. 5), and the insulated transmission circuit generates the first received signal (SET) by transmitting the transition from the first level to the second level of the signal level of the control signal to the primary side by using the capacitor, and generates the second received signal (IPCNT) by transmitting the transition from the second level to the first level of the signal level of the control signal to the primary side by using the capacitor.

Alternatively, for example, the isolated DC/DC converter according to one of the configurations $X_4$ to $X_7$ (see FIG. 12) may have a configuration $X_{10}$ in which the insulated element is formed by a pulse transformer.

In addition, for example, the isolated DC/DC converter according to one of the configurations $X_5$ to $X_7$ (see FIG. 12) may have a configuration $X_{11}$ in which the insulated element includes a first pulse transformer and a second pulse transformer (362 and 372), and the insulated transmission circuit generates the first received signal (SET) by transmitting the transition from the first level to the second level of the signal level of the control signal to the primary side by using the first pulse transformer, and generates the second received signal (IPCNT) by transmitting the transition from the second level to the first level of the signal level of the control signal to the primary side by using the second pulse transformer.

Incidentally, while in each of the foregoing embodiments, the first level corresponds to a low level, and the second level corresponds to a high level, the first and second levels can freely be selected as long as the first and second levels are levels different from each other.

In addition, while in each of the foregoing embodiments, the above-described predetermined direction as a direction of monotonic change in the slope voltage $V_{SLP}$ is a rising direction, a modification may be made such that the above-described predetermined direction is a decreasing direction. In a case where this modification is applied, change directions, height relation, and the like of voltages related to the slope voltage $V_{SLP}$ are reversed appropriately. That is, in the case where the above-described modification is applied, for example, the above-described predetermined initial voltage is the maximum voltage $V_{SLP\_MAX}$ of the slope voltage $V_{SLP}$, reversal of the magnitude relation between the error voltage $V_{ERR}$ and the slope voltage $V_{SLP}$ means a change from "$V_{ERR}<V_{SLP}$" to "$V_{ERR}>V_{SLP}$," and it suffices for the error amplifier 211 to control the error voltage $V_{ERR}$ such that the error voltage $V_{ERR}$ decreases when "$V_{FB}<V_{REF}$" and such that the error voltage $V_{ERR}$ rises when "$V_{FB}>V_{REF}$."

The embodiment of the present disclosure can be modified in various manners as appropriate within the scope of technical ideas illustrated in claims. The above embodiment is merely an example of an embodiment of the present disclosure, and the meanings of terms of the present disclosure or respective constituent elements are not limited to those described in the above embodiment. Concrete numerical values illustrated in the foregoing descriptive sentences are merely illustrative, and the numerical values can obviously be changed to various numerical values.

What is claimed is:

1. An isolated direct current to direct current converter for generating a secondary side voltage on a secondary side from a primary side voltage on a primary side by using a power transformer having a primary side winding and a secondary side winding insulated from each other, the isolated direct current to direct current converter comprising:
    a primary side control circuit that is disposed on the primary side and switches a switching element connected in series with the primary side winding;
    a secondary side control circuit that is disposed on the secondary side and generates a control signal including first control information and second control information on a basis of the secondary side voltage; and
    an insulated transmission circuit that transmits, in an insulated manner, each piece of control information included in the control signal to the primary side control circuit;
    the primary side control circuit controlling a switching frequency of the switching element on a basis of the first control information, and controlling a peak value of a primary side current flowing through the primary side winding through the switching element on a basis of the second control information.

2. The isolated direct current to direct current converter according to claim 1, wherein
    the secondary side control circuit includes an error voltage generating unit that generates an error voltage corresponding to a difference between a feedback voltage corresponding to the secondary side voltage and a predetermined reference voltage, and a control signal generating unit that generates the control signal on a basis of the error voltage and a slope voltage that varies within a predetermined range.

3. The isolated direct current to direct current converter according to claim 2, wherein
    the control signal has information regarding a frequency corresponding to the error voltage as the first control information, and has information corresponding to a result of comparison between the error voltage and the slope voltage as the second control information.

4. The isolated direct current to direct current converter according to claim 3, wherein
    the control signal generating unit generates, as the control signal, a signal having the frequency corresponding to the error voltage and having a pulse width corresponding to the result of the comparison between the error voltage and the slope voltage,
    the first control information is information regarding the frequency of the control signal, and the second control information is information regarding the pulse width of the control signal,
    the insulated transmission circuit generates a first received signal having the first control information and a second received signal having the second control information on the primary side by transmitting the first and second control information to the primary side by using an insulated element disposed between the primary side and the secondary side, and
    the primary side control circuit controls the switching frequency of the switching element and controls the peak value of the primary side current flowing through the primary side winding through the switching element, on a basis of the first and second received signals.

5. The isolated direct current to direct current converter according to claim 4, wherein
    the control signal is a rectangular wave signal assuming a signal level of a first level or a second level,
    a length of a period in which the signal level of the control signal is the second level corresponds to the pulse width of the control signal in each cycle of the control signal,
    the control signal generating unit makes the signal level of the control signal make a transition from the first level to the second level at the frequency corresponding to the error voltage, and makes the signal level of the control signal make a transition from the second level to the first level on a basis of the result of the comparison between the error voltage and the slope voltage in each cycle of the control signal, the cycle starting in transition timing from the first level to the second level,
    using the insulated element, the insulated transmission circuit generates the first received signal including a pulse synchronous with the transition from the first level to the second level of the signal level of the control signal on the primary side, and generates the second received signal including a pulse synchronous with the transition from the second level to the first level of the signal level of the control signal on the primary side, and the primary side control circuit includes a determination voltage setting unit that sets a determination voltage variably within a predetermined voltage range on a basis of the second received signal, and turns off the switching element when a current sense voltage proportional to the primary side current reaches the determination voltage after turning on the switching element in synchronism with timing of the pulse in the first received signal.

6. The isolated direct current to direct current converter according to claim 5, wherein the control signal generating unit makes the signal level of the control signal make a transition from the first level to the second level at the frequency corresponding to the error voltage, the slope voltage monotonically changes in a predetermined direction from a predetermined initial voltage in each cycle of the control signal, the cycle starting in the transition timing, and when magnitude relation between the error voltage and the slope voltage is reversed before passage of a predetermined time from the transition timing, the control signal generating unit makes the signal level of the control signal make a transition from the second level to the first level in timing succeeding the transition timing by the predetermined time, and when the magnitude relation is reversed after the passage of the predetermined time from the transition timing, the control signal generating unit makes the signal level of the control signal make a transition from the second level to the first level in timing of the reversal.

7. The isolated direct current to direct current converter according to claim 5, wherein the determination voltage setting unit fixes the determination voltage until the switching element is turned off after the switching element is turned on in synchronism with the pulse in the first received signal, sets the determination voltage to a maximum voltage within the voltage range when the switching element is turned off, then decreases the determination voltage from the maximum voltage within the voltage range according to a predetermined rule with the pulse in the second received signal as a trigger, and stops decreasing the determination voltage when a next pulse occurs in the first received signal.

8. The isolated direct current to direct current converter according to claim 5, wherein the insulated element is formed by a capacitor, and
the insulated transmission circuit generates the first received signal by transmitting the transition from the first level to the second level of the signal level of the control signal to the primary side by using the capacitor, and generates the second received signal by transmitting the transition from the second level to the first level of the signal level of the control signal to the primary side by using the capacitor.

9. The isolated direct current to direct current converter according to claim 5, wherein the insulated element includes a first pulse transformer and a second pulse transformer, and
the insulated transmission circuit generates the first received signal by transmitting the transition from the first level to the second level of the signal level of the control signal to the primary side by using the first pulse transformer, and generates the second received signal by transmitting the transition from the second level to the first level of the signal level of the control signal to the primary side by using the second pulse transformer.

10. The isolated direct current to direct current converter according to claim 4, wherein the insulated element is formed by a capacitor.

11. The isolated direct current to direct current converter according to claim 4, wherein the insulated element is formed by a pulse transformer.

12. An alternating current to direct current converter comprising:

a rectifier circuit that full wave rectifies an alternating-current voltage;
a smoothing capacitor that generates a direct-current voltage by smoothing the full wave rectified voltage; and
the isolated direct current to direct current converter according to claim 1, the isolated direct current to direct current converter generating the secondary side voltage of a direct current as an output voltage from the primary side voltage as the direct-current voltage.

* * * * *